US012561481B2

(12) United States Patent
Zou et al.

(10) Patent No.: US 12,561,481 B2
(45) Date of Patent: Feb. 24, 2026

(54) DATA SHARING SYSTEM, METHOD AND APPARATUS, AND DEVICE AND MEDIUM

(71) Applicant: CHINA UNIONPAY CO., LTD., Shanghai (CN)

(72) Inventors: Fen Zou, Shanghai (CN); Hang Yuan, Shanghai (CN); Dingzhou Li, Shanghai (CN); Yongkai Zhou, Shanghai (CN); Qi Wang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 19/112,335

(22) PCT Filed: Dec. 7, 2022

(86) PCT No.: PCT/CN2022/137360
§ 371 (c)(1),
(2) Date: Mar. 17, 2025

(87) PCT Pub. No.: WO2024/060411
PCT Pub. Date: Mar. 28, 2024

(65) Prior Publication Data
US 2026/0004003 A1     Jan. 1, 2026

(30) Foreign Application Priority Data

Sep. 19, 2022     (CN) .......................... 202211147485.8

(51) Int. Cl.
*G06F 21/00*          (2013.01)
*G06F 21/53*          (2013.01)
(Continued)

(52) U.S. Cl.
CPC .......... *G06F 21/6254* (2013.01); *G06F 21/53* (2013.01); *G06F 21/602* (2013.01); *G06F 2221/2141* (2013.01)

(58) Field of Classification Search
CPC .... G06F 21/6254; G06F 21/602; G06F 21/53; G06F 2221/2141
See application file for complete search history.

(56) References Cited

U.S. PATENT DOCUMENTS

2004/0098348 A1     5/2004   Kawasaki et al.
2014/0108518 A1     4/2014   D'Angelo et al.
(Continued)

FOREIGN PATENT DOCUMENTS

CN        108933838 A      12/2018
CN        111459899 A       7/2020
(Continued)

OTHER PUBLICATIONS

The World Intellectual Property Organization (WIPO) International Search Report for PCT/CN2022/137360 Jun. 13, 2023 7 Pages (including translation).

*Primary Examiner* — Joseph P Hirl
*Assistant Examiner* — Chi D Nguy
(74) *Attorney, Agent, or Firm* — ANOVA LAW GROUP, PLLC

(57) ABSTRACT

The disclosure describes a data sharing system, method, apparatus, a device and a medium. In the data sharing method, a device to which a first application belongs determines, according to a pre-stored correspondence between application identifiers and access addresses, a target access address corresponding to a target application identifier of a second application, and sends to the target access address a sharing request for sharing data of the second application, where the sharing request carries the target application identifier; and a device to which the target access address belongs obtains data stored in a target database, determines a target encryption key corresponding to the target application identifier, decrypts the obtained data according to the
(Continued)

target encryption key, and sends the decrypted data to the device to which the first application belongs.

19 Claims, 12 Drawing Sheets

(51) Int. Cl.
G06F 21/60 (2013.01)
G06F 21/62 (2013.01)

(56)                    References Cited

U.S. PATENT DOCUMENTS

| | | | | |
|---|---|---|---|---|
| 2016/0112376 A1* | 4/2016 | Gomez | .................. | H04L 63/20 |
| | | | | 713/168 |
| 2018/0046810 A1* | 2/2018 | Ferrara | .............. | H04L 63/1433 |
| 2019/0202402 A1* | 7/2019 | Sakurada | .......... | G07C 9/00571 |
| 2020/0119921 A1 | 4/2020 | Rodriguez et al. | | |
| 2021/0056225 A1* | 2/2021 | Sislow | ............... | G06F 21/6227 |

FOREIGN PATENT DOCUMENTS

| | | | |
|---|---|---|---|
| CN | 113704210 A | 11/2021 |
| CN | 114553586 A | 5/2022 |
| CN | 114710274 A | 7/2022 |
| TW | 201625752 A | 7/2016 |
| TW | 201626752 A | 7/2016 |

* cited by examiner

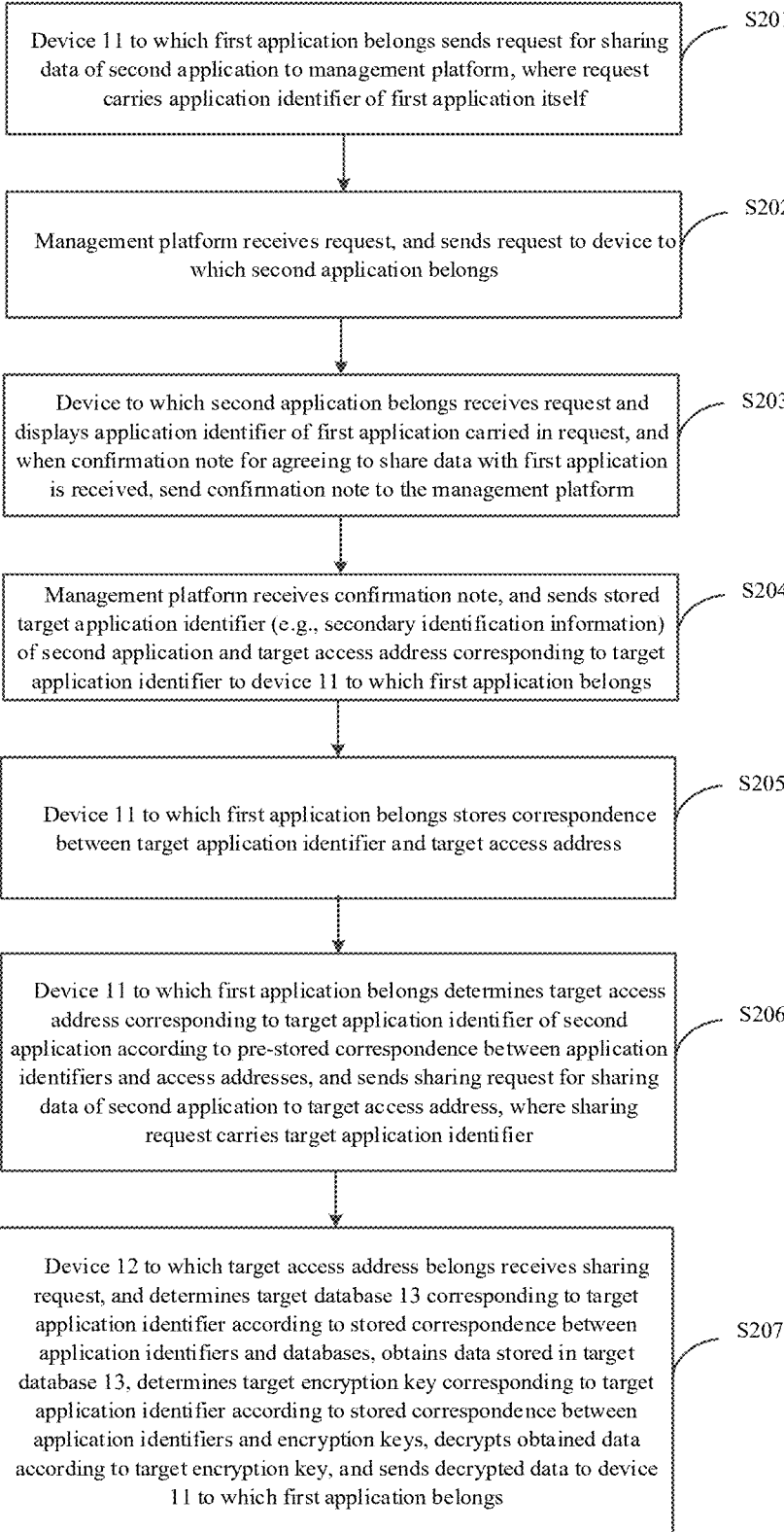

Device 11 to which first application belongs sends request for sharing data of second application to management platform, where request carries application identifier of first application itself — S201

Management platform receives request, and sends request to device to which second application belongs — S202

Device to which second application belongs receives request and displays application identifier of first application carried in request, and when confirmation note for agreeing to share data with first application is received, send confirmation note to the management platform — S203

Management platform receives confirmation note, and sends stored target application identifier (e.g., secondary identification information) of second application and target access address corresponding to target application identifier to device 11 to which first application belongs — S204

Device 11 to which first application belongs stores correspondence between target application identifier and target access address — S205

Device 11 to which first application belongs determines target access address corresponding to target application identifier of second application according to pre-stored correspondence between application identifiers and access addresses, and sends sharing request for sharing data of second application to target access address, where sharing request carries target application identifier — S206

Device 12 to which target access address belongs receives sharing request, and determines target database 13 corresponding to target application identifier according to stored correspondence between application identifiers and databases, obtains data stored in target database 13, determines target encryption key corresponding to target application identifier according to stored correspondence between application identifiers and encryption keys, decrypts obtained data according to target encryption key, and sends decrypted data to device 11 to which first application belongs — S207

FIG. 2

Figure 3:
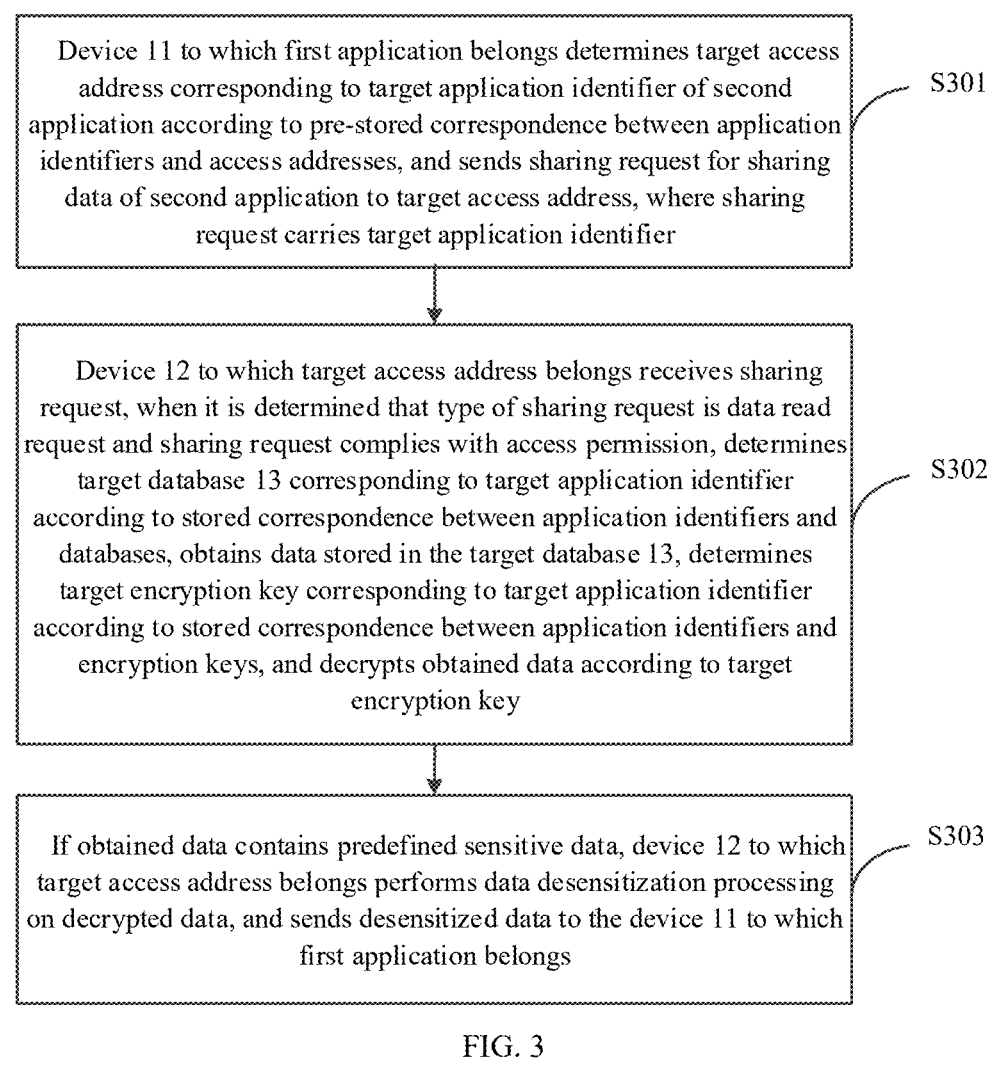

Device 11 to which first application belongs determines target access address corresponding to target application identifier of second application according to pre-stored correspondence between application identifiers and access addresses, and sends sharing request for sharing data of second application to target access address, where sharing request carries target application identifier

S301

Device 12 to which target access address belongs receives sharing request, when it is determined that type of sharing request is data read request and sharing request complies with access permission, determines target database 13 corresponding to target application identifier according to stored correspondence between application identifiers and databases, obtains data stored in the target database 13, determines target encryption key corresponding to target application identifier according to stored correspondence between application identifiers and encryption keys, and decrypts obtained data according to target encryption key

S302

If obtained data contains predefined sensitive data, device 12 to which target access address belongs performs data desensitization processing on decrypted data, and sends desensitized data to the device 11 to which first application belongs

Figure 4:
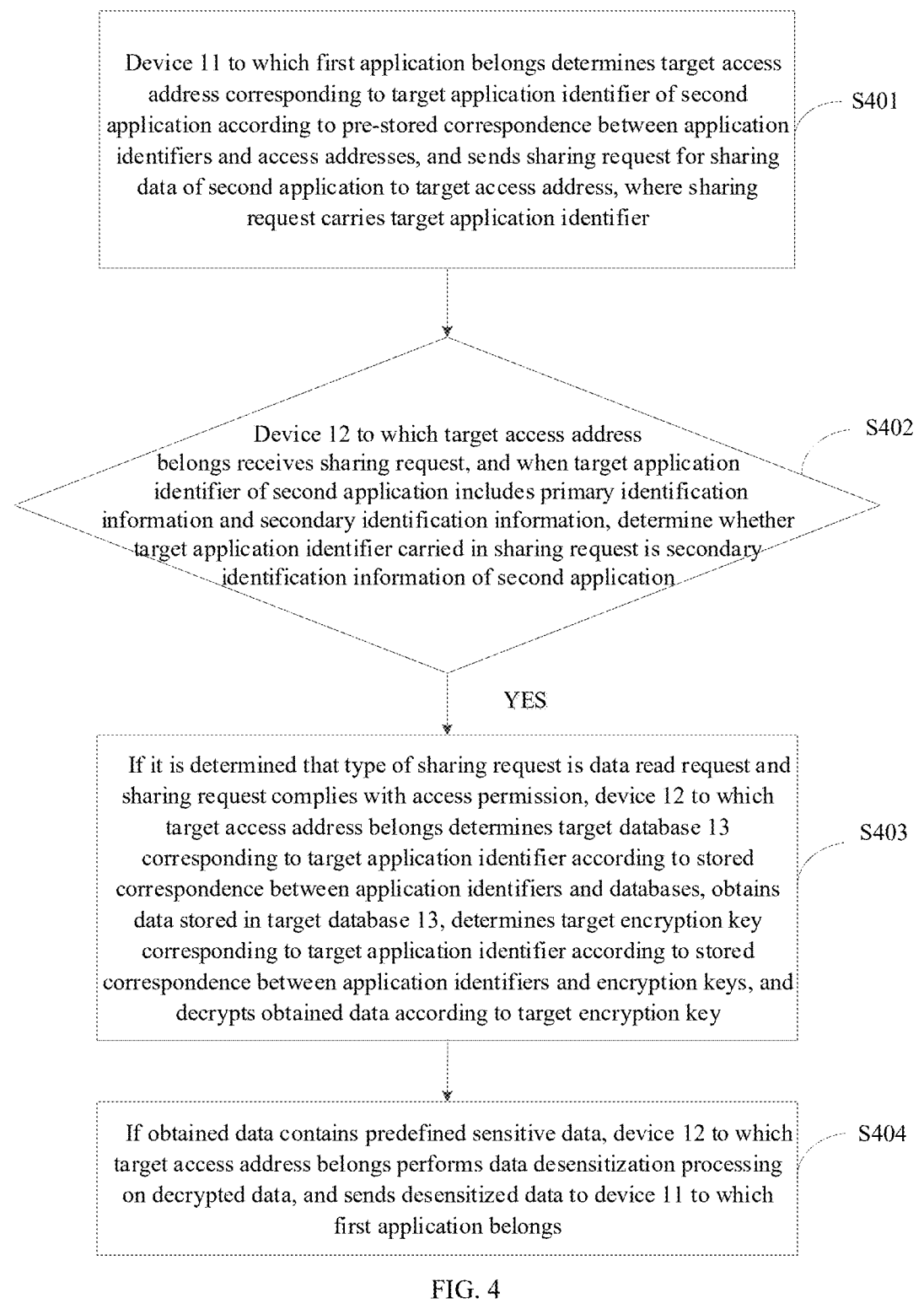

Device 11 to which first application belongs determines target access
address corresponding to target application identifier of second
application according to pre-stored correspondence between application
identifiers and access addresses, and sends sharing request for sharing
data of second application to target access address, where sharing
request carries target application identifier

S401

Device 12 to which target access address
belongs receives sharing request, and when target application
identifier of second application includes primary identification
information and secondary identification information, determine whether
target application identifier carried in sharing request is secondary
identification information of second application

S402

YES

If it is determined that type of sharing request is data read request and
sharing request complies with access permission, device 12 to which
target access address belongs determines target database 13
corresponding to target application identifier according to stored
correspondence between application identifiers and databases, obtains
data stored in target database 13, determines target encryption key
corresponding to target application identifier according to stored
correspondence between application identifiers and encryption keys, and
decrypts obtained data according to target encryption key

S403

If obtained data contains predefined sensitive data, device 12 to which
target access address belongs performs data desensitization processing
on decrypted data, and sends desensitized data to device 11 to which
first application belongs

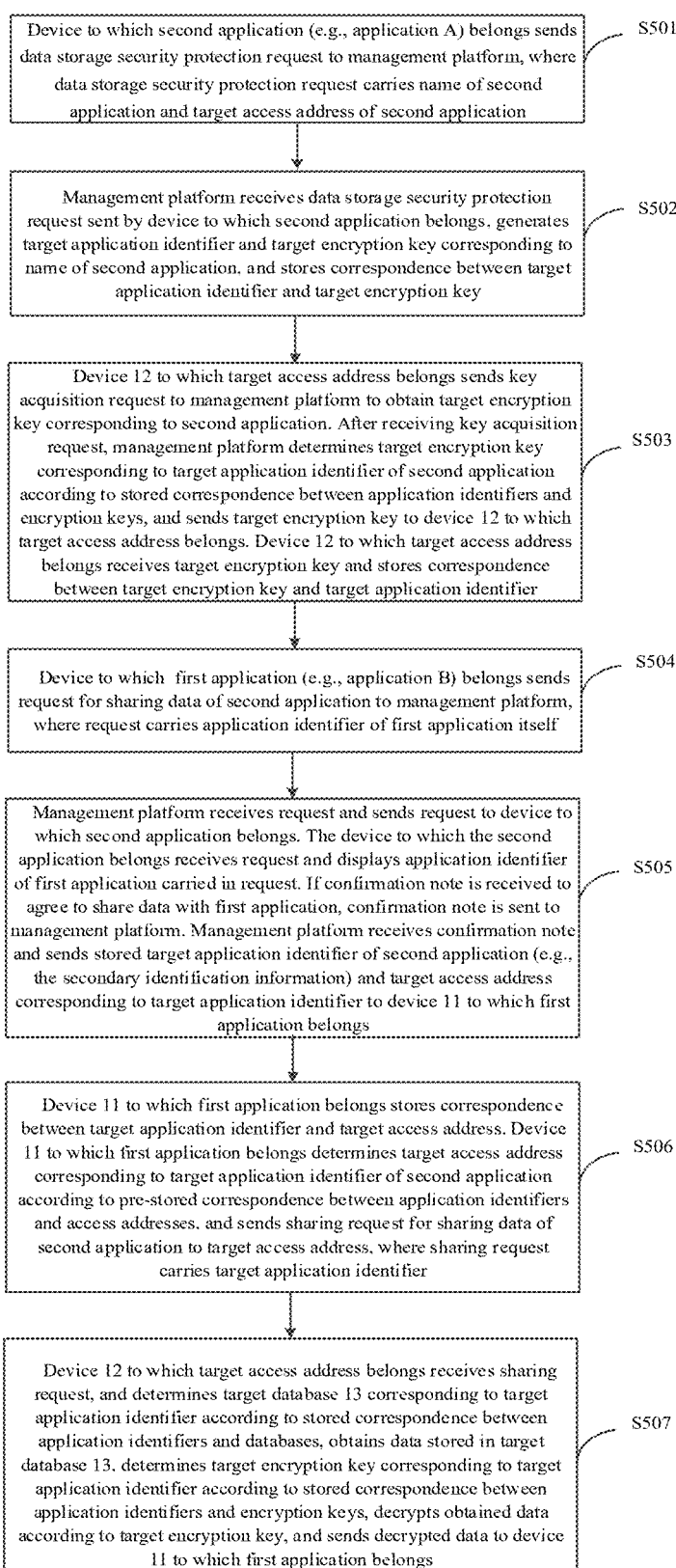

Device to which second application (e.g., application A) belongs sends data storage security protection request to management platform, where data storage security protection request carries name of second application and target access address of second application — S501

Management platform receives data storage security protection request sent by device to which second application belongs, generates target application identifier and target encryption key corresponding to name of second application, and stores correspondence between target application identifier and target encryption key — S502

Device 12 to which target access address belongs sends key acquisition request to management platform to obtain target encryption key corresponding to second application. After receiving key acquisition request, management platform determines target encryption key corresponding to target application identifier of second application according to stored correspondence between application identifiers and encryption keys, and sends target encryption key to device 12 to which target access address belongs. Device 12 to which target access address belongs receives target encryption key and stores correspondence between target encryption key and target application identifier — S503

Device to which first application (e.g., application B) belongs sends request for sharing data of second application to management platform, where request carries application identifier of first application itself — S504

Management platform receives request and sends request to device to which second application belongs. The device to which the second application belongs receives request and displays application identifier of first application carried in request. If confirmation note is received to agree to share data with first application, confirmation note is sent to management platform. Management platform receives confirmation note and sends stored target application identifier of second application (e.g., the secondary identification information) and target access address corresponding to target application identifier to device 11 to which first application belongs — S505

Device 11 to which first application belongs stores correspondence between target application identifier and target access address. Device 11 to which first application belongs determines target access address corresponding to target application identifier of second application according to pre-stored correspondence between application identifiers and access addresses, and sends sharing request for sharing data of second application to target access address, where sharing request carries target application identifier — S506

Device 12 to which target access address belongs receives sharing request, and determines target database 13 corresponding to target application identifier according to stored correspondence between application identifiers and databases, obtains data stored in target database 13, determines target encryption key corresponding to target application identifier according to stored correspondence between application identifiers and encryption keys, decrypts obtained data according to target encryption key, and sends decrypted data to device 11 to which first application belongs — S507

FIG. 5

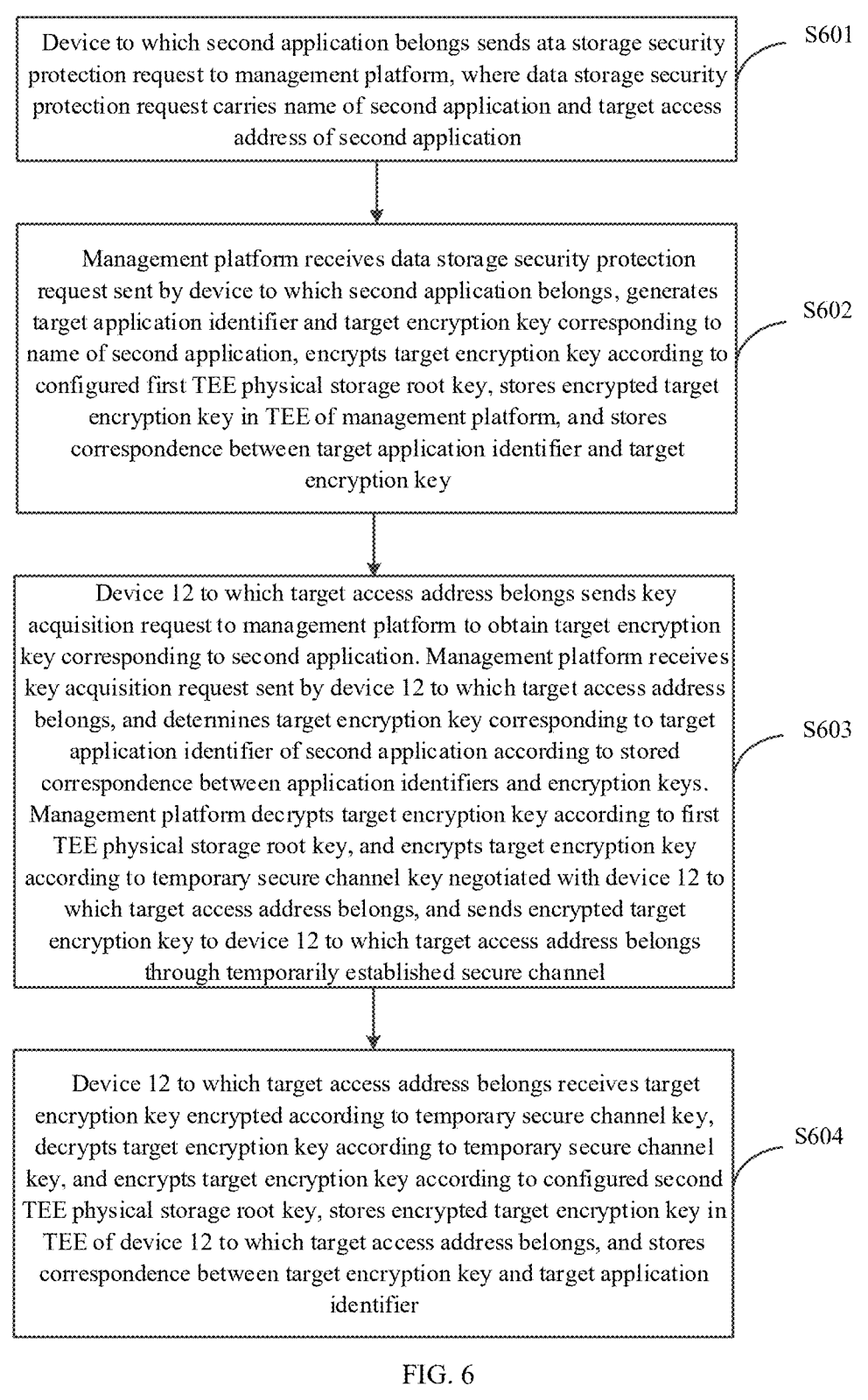

Device to which second application belongs sends ata storage security protection request to management platform, where data storage security protection request carries name of second application and target access address of second application — S601

Management platform receives data storage security protection request sent by device to which second application belongs, generates target application identifier and target encryption key corresponding to name of second application, encrypts target encryption key according to configured first TEE physical storage root key, stores encrypted target encryption key in TEE of management platform, and stores correspondence between target application identifier and target encryption key — S602

Device 12 to which target access address belongs sends key acquisition request to management platform to obtain target encryption key corresponding to second application. Management platform receives key acquisition request sent by device 12 to which target access address belongs, and determines target encryption key corresponding to target application identifier of second application according to stored correspondence between application identifiers and encryption keys. Management platform decrypts target encryption key according to first TEE physical storage root key, and encrypts target encryption key according to temporary secure channel key negotiated with device 12 to which target access address belongs, and sends encrypted target encryption key to device 12 to which target access address belongs through temporarily established secure channel — S603

Device 12 to which target access address belongs receives target encryption key encrypted according to temporary secure channel key, decrypts target encryption key according to temporary secure channel key, and encrypts target encryption key according to configured second TEE physical storage root key, stores encrypted target encryption key in TEE of device 12 to which target access address belongs, and stores correspondence between target encryption key and target application identifier — S604

FIG. 6

Device to
Which Second
application
Belongs plaintext

Device to
Which Second
application
Belongs plaintext

Device to
Which Second
application
Belongs

Pre-encryption Module

Gateway ciphertext

Database ciphertext

Database ciphertext

Database

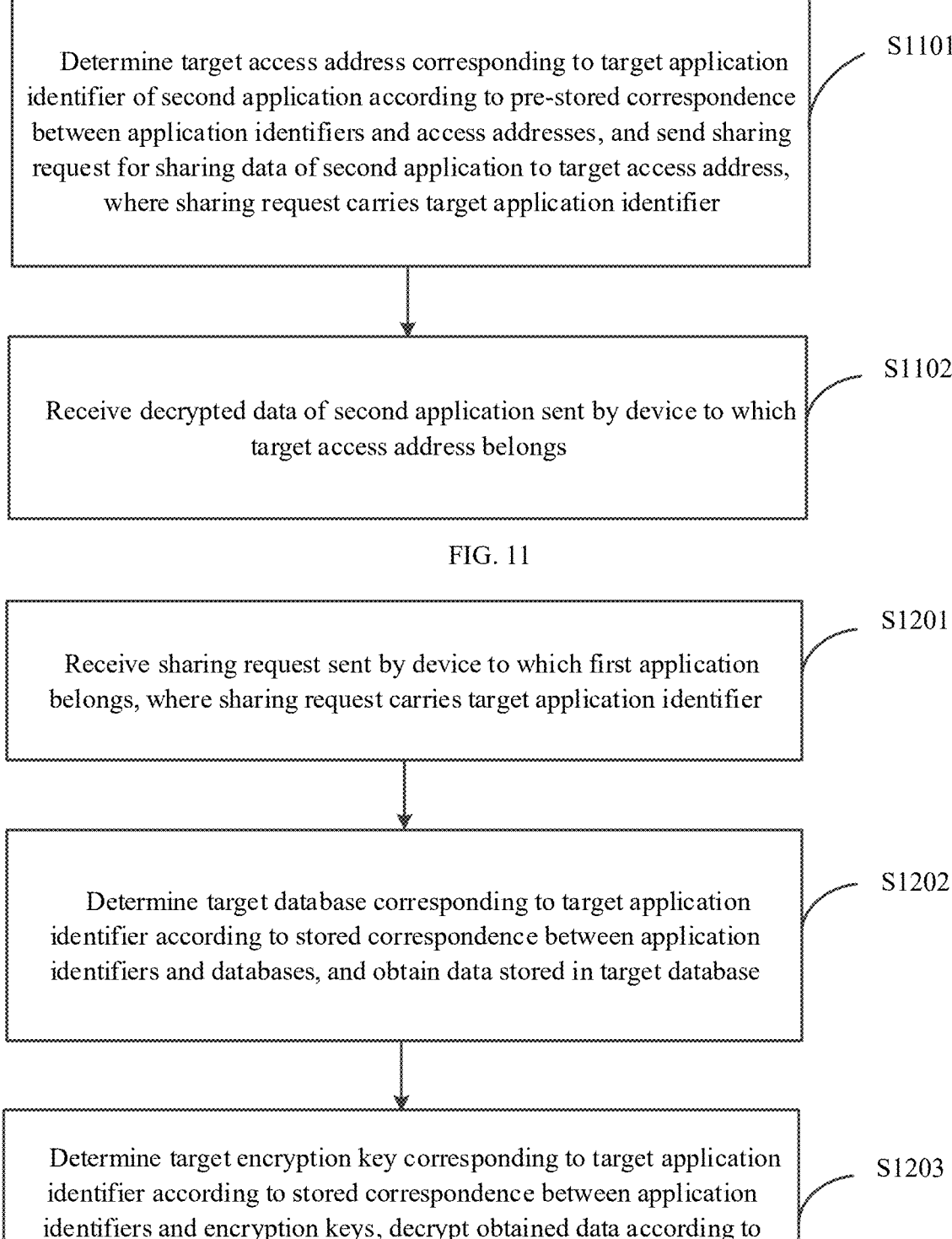

Determine target access address corresponding to target application identifier of second application according to pre-stored correspondence between application identifiers and access addresses, and send sharing request for sharing data of second application to target access address, where sharing request carries target application identifier
— S1101

Receive decrypted data of second application sent by device to which target access address belongs
— S1102

FIG. 11

Receive sharing request sent by device to which first application belongs, where sharing request carries target application identifier
— S1201

Determine target database corresponding to target application identifier according to stored correspondence between application identifiers and databases, and obtain data stored in target database
— S1202

Determine target encryption key corresponding to target application identifier according to stored correspondence between application identifiers and encryption keys, decrypt obtained data according to target encryption key, and send decrypted data to device to which first application belongs
— S1203

FIG. 12

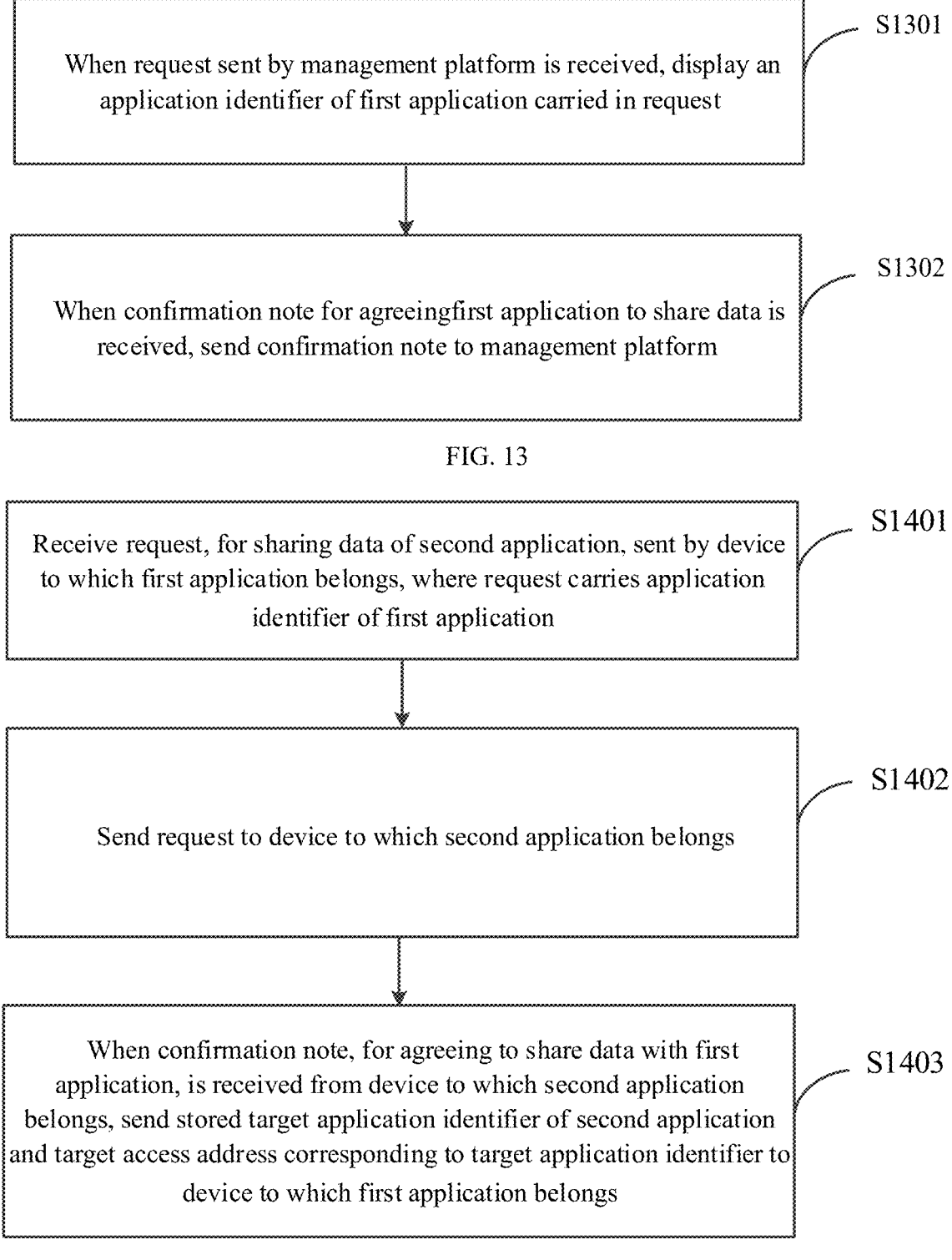

When request sent by management platform is received, display an application identifier of first application carried in request — S1301

When confirmation note for agreeingfirst application to share data is received, send confirmation note to management platform — S1302

FIG. 13

Receive request, for sharing data of second application, sent by device to which first application belongs, where request carries application identifier of first application — S1401

Send request to device to which second application belongs — S1402

When confirmation note, for agreeing to share data with first application, is received from device to which second application belongs, send stored target application identifier of second application and target access address corresponding to target application identifier to device to which first application belongs — S1403

FIG. 14

DATA SHARING SYSTEM, METHOD AND APPARATUS, AND DEVICE AND MEDIUM

CROSS-REFERENCE TO RELATED APPLICATION

This application is a national phase entry under 35 U.S.C. § 371 of International Application No. PCT/CN2022/137360, filed on Dec. 7, 2022, which claims priority to Chinese Patent Application No. 202211147485.8 entitled "DATA SHARING SYSTEM, METHOD AND APPARATUS, AND DEVICE AND MEDIUM," filed on Sep. 19, 2022, the entire content of all of which is incorporated herein by reference.

FIELD OF THE DISCLOSURE

The disclosure generally relates to the technical field of data sharing, and in particular to a data sharing system, method, apparatus, device and medium.

BACKGROUND

Traditional data protection focuses on encrypting and protecting data when the data is transmitted and written to storage media. The existing security protection capabilities for application data in the computing state (i.e., in use) are insufficient, resulting in the lack of the most important link in the data security chain. Therefore, there is an urgent need to ensure the security of application data in the computing state.

However, even if the security of the data of each application in the computing state may be guaranteed, since in actual application scenarios there are usually situations where multiple applications need to share data, how to achieve data sharing between multiple applications while ensuring the security of the data of each application in the computing state is also a technical problem that needs to be solved urgently.

SUMMARY

The disclosure provides a data sharing system, method, apparatus, device and medium for enabling data sharing between multiple applications while ensuring the security of the data of each application.

In a first aspect, the disclosure provides a data sharing system, the system including: a device to which a first application belongs, configured to determine a target access address corresponding to a target application identifier of a second application according to a pre-stored correspondence between application identifiers and access addresses, and send a sharing request for sharing data of the second application to the target access address, where the sharing request carries the target application identifier; a device to which the target access address belongs, configured to receive the sharing request and determine a target database corresponding to the target application identifier according to a stored correspondence between application identifiers and databases, obtain data stored in the target database, determine a target encryption key corresponding to the target application identifier according to a stored correspondence between application identifiers and encryption keys, decrypt the obtained data according to the target encryption key, and send the decrypted data to the device to which the first application belongs; and the target database, configured for data storage.

In a second aspect, the disclosure provides a data sharing method, which is applied to a device to which a first application belongs, and the method includes: determining a target access address corresponding to a target application identifier of a second application according to a pre-stored correspondence between application identifiers and access addresses, and send a sharing request for sharing data of the second application to the target access address, where the sharing request carries the target application identifier; and receiving decrypted data of the second application sent by a device to which the target access address belongs.

In a third aspect, the disclosure provides a data sharing method, which is applied to a device to which a target access address belongs, and the method includes: receiving a sharing request sent by a device to which a first application belongs, where the sharing request carries a target application identifier; determining a target database corresponding to the target application identifier according to a stored correspondence between application identifiers and databases, and obtaining data stored in the target database; and determining a target encryption key corresponding to the target application identifier according to a stored correspondence between application identifiers and encryption keys, decrypting the obtained data according to the target encryption key, and sending the decrypted data to the device to which the first application belongs.

In a fourth aspect, the disclosure provides a data sharing method, which is applied to a device to which a second application belongs, and the method includes: when a request sent by a management platform is received, displaying an application identifier of a first application carried in the request; and when a confirmation note for agreeing the first application to share data is received, sending the confirmation note to the management platform.

In a fifth aspect, the disclosure provides a data sharing method, which is applied to a management platform, and the method includes: receiving a request for sharing data of a second application, sent by a device to which a first application belongs, where the request carries an application identifier of the first application; sending the request to a device to which the second application belongs; and when a confirmation note is received from the device to which the second application belongs for agreeing to share data with the first application, sending a stored target application identifier of the second application and a target access address corresponding to the target application identifier to the device to which the first application belongs.

In a sixth aspect, the disclosure provides a data sharing apparatus, the apparatus including: a first determination module, configured to determine a target access address corresponding to a target application identifier of a second application according to a pre-stored correspondence between application identifiers and access addresses, and send a sharing request for sharing data of the second application to the target access address, where the sharing request carries the target application identifier; and a first receiving module, configured to receive decrypted data of the second application sent by a device to which the target access address belongs.

In a seventh aspect, the disclosure provides a data sharing apparatus, the apparatus including: a second receiving module, configured to receive a sharing request sent by a device to which a first application belongs, where the sharing request carries a target application identifier; a second determination module, configured to determine a target database corresponding to the target application identifier according to a stored correspondence between application identifiers and databases, and obtain data stored in the target database; and an encryption and decryption module, configured to determine a target encryption key corresponding to the target application identifier according to a stored correspondence between application identifiers and encryption keys, decrypt the obtained data according to the target encryption key, and send the decrypted data to the device to which the first application belongs.

In an eighth aspect, the disclosure provides a data sharing apparatus, the apparatus including: a display module, configured to display an application identifier of a first application carried in a request when a request sent by a management platform is received; and a first transmission module, configured to send a confirmation note to a management platform when a confirmation note for agreeing to share data with the first application is received.

In a ninth aspect, the disclosure provides a data sharing apparatus, the apparatus including: a third receiving module, configured to receive a request for sharing data of a second application, sent by a device to which a first application belongs, where the request carries an application identifier of the first application; and a second transmission module, configured to send the request to a device to which the second application belongs, when a confirmation note for agreeing to share data with the first application is received from the device to which the second application belongs, send a stored target application identifier of the second application and a target access address corresponding to the target application identifier to the device to which the first application belongs.

In a tenth aspect, the disclosure provides an electronic device, including a processor and a memory, where the memory stores program code, and when the program code is executed by the processor, the processor executes the steps of the method described in any one of the second to fifth aspects.

In an eleventh aspect, the disclosure provides a computer-readable storage medium, which includes a program code. When the storage medium is run on an electronic device, the program code is configured to enable the electronic device to execute the steps of the method described in any one of the second to fifth aspects.

In the embodiments of the disclosure, the device to which the first application belongs may determine the target access address corresponding to the target application identifier of the second application according to the stored correspondence between application identifiers and access addresses, and send a sharing request for sharing the data of the second application to the target access address, where the sharing request carries the target application identifier. The device to which the target access address belongs may receive the sharing request, determine the target database corresponding to the target application identifier according to the stored correspondence between application identifiers and databases, obtain the data stored in the target database, determine the target encryption key corresponding to the target application identifier according to the stored correspondence between application identifiers and encryption keys, decrypt the obtained data according to the target encryption key, and send the decrypted data to the device to which the first application belongs. Accordingly, the purpose of sharing data between multiple applications may be achieved under the premise of ensuring the security of the data of each application.

BRIEF DESCRIPTION OF THE DRAWINGS

In order to more clearly illustrate the embodiments of the disclosure or the related technologies, the following is a brief introduction to the drawings essential for understanding the embodiments or the related technology descriptions. Apparently, the drawings described below are some embodiments of the disclosure, and a person skilled in the art may also obtain other drawings according to these drawings.

FIG. 2 shows a schematic diagram of a first data sharing process in accordance with some embodiments;

FIG. 3 shows a schematic diagram of a second data sharing process in accordance with some embodiments;

FIG. 4 shows a schematic diagram of a third data sharing process in accordance with some embodiments;

FIG. 5 shows a schematic diagram of a fourth data sharing process in accordance with some embodiments;

FIG. 6 shows a schematic diagram of a fifth data sharing process in accordance with some embodiments;

FIG. 11 shows a schematic diagram of a sixth data sharing process in accordance with some embodiments;

FIG. 12 shows a schematic diagram of a seventh data sharing process in accordance with some embodiments;

FIG. 13 shows a schematic diagram of an eighth data sharing process in accordance with some embodiments;

FIG. 14 shows a schematic diagram of a ninth data sharing process in accordance with some embodiments;

DETAILED DESCRIPTION

In order to enable data sharing between multiple applications while ensuring the security of the data of each application, the disclosure provides a data sharing system, method, apparatus, device and medium.

In order to make the purposes and embodiments of the disclosure clearer, the exemplary embodiments of the disclosure will be clearly and thoroughly described below in conjunction with the drawings in the exemplary embodiments of the disclosure. Apparently, the described exemplary embodiments are merely part of the embodiments of the disclosure, rather than all the embodiments.

It should be noted that the brief description of terms in the disclosure is merely for the convenience of understanding the embodiments described below, and is not intended to limit the embodiments of the disclosure. Unless otherwise specified, these terms should be understood according to their ordinary and common meanings.

The terms "first", "second", "third", etc., in the specification and claims of the disclosure and the above drawings are used to distinguish same or similar objects or entities, and do not necessarily mean to limit a specific order or sequence, unless otherwise noted. It should be understood that the terms used in this way may be interchangeable under appropriate circumstances.

The terms "comprise," "comprising," and "include," and any variations thereof, are intended to cover non-exclusive inclusions. For example, a product or device comprising/including a list of components is not necessarily limited to all the components expressly listed but may include other components not expressly listed or inherent to such product or device.

The term "module" refers to any known or later developed hardware, software, firmware, artificial intelligence, fuzzy logic, or combination of hardware and/or software code that is capable of performing the functions associated with that element.

Further, it should be noted that the above embodiments are merely used to illustrate the technical solutions of the disclosure, rather than to limit the disclosure. Although the disclosure has been described in detail with reference to the specific embodiments, those skilled in the art should understand that they may still modify the technical solutions described in these embodiments, or replace some or all of the technical features therein with equivalents. However, these modifications or replacements do not cause the essence of the corresponding technical solutions to deviate from the scope of the technical solutions of the embodiments of the disclosure.

Figure 1:
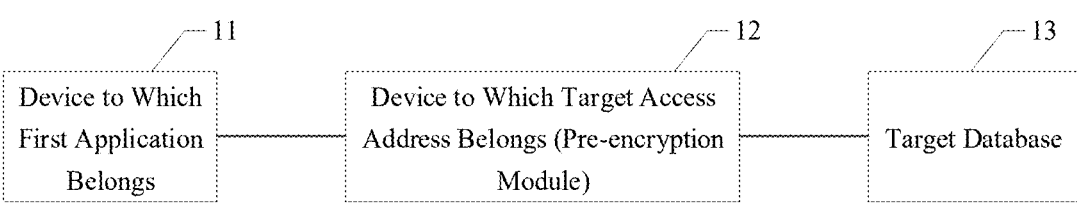
FIG. 1 shows a schematic diagram of a data sharing system in accordance with some embodiments.

FIG. 1 shows a schematic diagram of a data sharing system in accordance with some embodiments. As shown in FIG. 1, the system includes the following components.

A device 11 to which a first application belongs, which is configured to determine a target access address corresponding to a target application identifier of a second application according to a pre-stored correspondence between application identifiers and access addresses, and send a sharing request for sharing data of the second application to the target access address, where the sharing request carries the target application identifier.

A device 12 to which the target access address belongs, which is configured to receive the sharing request, determine a target database 13 corresponding to the target application identifier according to a stored correspondence between application identifiers and databases, obtain data stored in the target database 13, determine a target encryption key corresponding to the target application identifier according to a stored correspondence between application identifiers and encryption keys, decrypt the obtained data according to the target encryption key, and send the decrypted data to the device 11 to which the first application belongs.

A target database 13, which is configured for data storage.

In some embodiments, the data sharing system includes a device 11 to which the first application belongs, a device 12 to which the target access address belongs, and a target database 13. When the device to which the first application (e.g., application B) belongs needs to obtain (or share) data of a second application (e.g., application A), the device 11 to which the first application belongs may determine the target access address corresponding to the target application identifier of the second application according to the stored correspondence between application identifiers and access addresses, and send a sharing request for sharing the data of the second application to the target access address. Optionally, the target application identifier of the second application may be carried in the sharing request.

The device 12 (also referred to as a pre-encryption module) to which the target access address belongs may receive the sharing request, and may determine the target database 13 corresponding to the target application identifier of the second application according to the pre-stored correspondence between application identifiers and databases, and then obtain data stored in the target database 13. In some embodiments, in order to ensure the security of the data of each application, for each application, the data stored in the database corresponding to the application may be data encrypted according to an encryption key corresponding to the application, that is, the data obtained from the target database 13 may be data encrypted according to the encryption key of the second application (e.g., application A). In order to achieve data sharing between different applications, decrypted data may be sent to the first application (e.g., application B). Specifically, the device 12 to which the target access address belongs may pre-store the correspondence between application identifiers and encryption keys. After obtaining the data from the target database 13, the device 12 to which the target access address belongs may determine a target encryption key corresponding to the target application identifier of the second application (e.g., application A) according to the stored correspondence between application identifiers and encryption keys, and decrypt the obtained data according to the target encryption key, and send the decrypted data to the device 11 to which the first application belongs. In this way, data sharing between multiple applications may be achieved while ensuring the security of the data of each application.

In some embodiments, if the first application (e.g., application B) wants to share the data of the second application (e.g., application A), the device 11 to which the first application (e.g., application B) belongs may first send a request to share the data of the second application to a management platform in the data sharing system. Optionally, the request may carry the application identifier of the first application itself. After receiving the request sent by the device to which the first application (e.g., application B) belongs, the management platform may send the request to the device to which the second application (e.g., application A) belongs. The device to which the second application (e.g., application A) belongs may receive the request sent by the management platform. In order to allow the management personnel of the second application to approve whether to allow the first application to share data, the device to which the second application (e.g., application A) belongs may display the application identifier of the first application carried in the request. Optionally, if the management personnel of the second application approves the request and agrees that the first application shares the data of the second application, the management personnel of the second application may click the approval button and the like. The device to which the second application belongs may receive a confirmation note to indicate an approval of the first application to share data, and may send the confirmation note to the management platform when receiving the confirmation note.

The management platform may receive the confirmation note sent by the device to which the second application belongs, and upon receiving the confirmation note, may send the stored target application identifier of the second application and the target access address corresponding to the target application identifier to the device 11 to which the first application belongs. Optionally, if the target application identifier of the second application includes primary identification information and secondary identification information, the management platform may send the secondary identification information therein to the device to which the first application (e.g., application B) belongs, and the device 11 to which the first application belongs stores a correspondence between the secondary identification information of the second application and the target access address. The primary identification information and secondary identification information of the second application will be describes in detail in subsequent embodiments and will not be described here.

In some embodiments, the device 11 to which the first application belongs may receive the target application identifier of the second application and the target access address corresponding to the target application identifier sent by the management platform, and may store the correspondence between the target application identifier and the target access address. Exemplarily, the correspondence may be stored in a configuration file (e.g., database configuration file) of the device 11 to which the first application belongs.

For ease of understanding, the data sharing process provided by the disclosure is described below through a specific embodiment. FIG. 2 shows a schematic diagram of a first data sharing process in accordance with some embodiments. The process includes the following steps.

S201: The device 11 to which the first application belongs sends a request for sharing data of the second application to the management platform, where the request carries the application identifier of the first application itself.

S202: The management platform receives the request, and sends the request to the device to which the second application belongs.

S203: The device to which the second application belongs receives the request and displays the application identifier of the first application carried in the request, and when a confirmation note for agreeing to share data with the first application is received, send the confirmation note to the management platform.

S204: The management platform receives the confirmation note, and sends the stored target application identifier (e.g., secondary identification information) of the second application and the target access address corresponding to the target application identifier to the device 11 to which the first application belongs.

S205: The device 11 to which the first application belongs stores the correspondence between the target application identifier and the target access address.

S206: The device 11 to which the first application belongs determines the target access address corresponding to the target application identifier of the second application according to the pre-stored correspondence between application identifiers and access addresses, and sends a sharing request for sharing the data of the second application to the target access address, where the sharing request carries the target application identifier.

S207: The device 12 to which the target access address belongs receives the sharing request, and determines the target database 13 corresponding to the target application identifier according to the stored correspondence between application identifiers and databases, obtains data stored in the target database 13, determines a target encryption key corresponding to the target application identifier according to the stored correspondence between application identifiers and encryption keys, decrypts the obtained data according to the target encryption key, and sends the decrypted data to the device 11 to which the first application belongs.

In some embodiments, taking into account that when a first application shares data of a second application, it is usually necessary to configure the set access permission for the first application. For example, the first application may only read the data of the second application but cannot write data in the database of the second application, or the sensitive data involved in the second application needs to be desensitized before being sent to the first application, etc. This then allows different applications to share data while increasing the security of the data of each application. After receiving the sharing request sent by the device 11 to which the first application belongs, the device 12 to which the target access address belongs may also determine whether the type of the sharing request is a data read request or a data write request before determining the target database 13 corresponding to the target application identifier according to the stored correspondence between application identifiers and databases. According to the type of the sharing request and the pre-stored access permission of the first application to the data of the second application, the device 12 to which the target access address belongs may determine whether the sharing request meets the corresponding access permission. For example, if the access permission of the first application to the second application is to only read data but not write data, then only when the type of shared data is a data read request, it is determined that the sharing request meets the corresponding access permission. Then subsequent steps are performed to determine the target database 13 corresponding to the target application identifier according to the stored correspondence between application identifiers and databases, obtain the data stored in the target database 13, determine the target encryption key corresponding to the target application identifier according to the stored correspondence between application identifiers and encryption keys, decrypt the obtained data according to the target encryption key, and send the decrypted data to the device 11 to which the first application belongs.

In some embodiments, if the data obtained from the target database 13 contains predefined sensitive data such as an ID number, in order to increase the security of the data, after decrypting the obtained data according to the target encryption key, before sending the decrypted data to the device 11 to which the first application belongs, the device 12 to which the target access address belongs may also perform data desensitization processing on the decrypted data, and send the desensitized data to the device 11 to which the first application belongs. Here, the existing technologies may be used to perform data desensitization processing on the data, which will not be described here.

For ease of understanding, the data sharing process provided by the disclosure is described below through another specific embodiment. FIG. 3 shows a schematic diagram of a second data sharing process in accordance with some embodiments. The process includes the following steps.

S301: The device 11 to which the first application belongs determines the target access address corresponding to the target application identifier of the second application according to the pre-stored correspondence between application identifiers and access addresses, and sends a sharing request for sharing the data of the second application to the target access address, where the sharing request carries the target application identifier.

S302: The device 12 to which the target access address belongs receives the sharing request, when it is determined that the type of the sharing request is a data read request and the sharing request complies with the access permission, determines the target database 13 corresponding to the target application identifier according to the stored correspondence between application identifiers and databases, obtains the data stored in the target database 13, determines the target encryption key corresponding to the target application identifier according to the stored correspondence between application identifiers and encryption keys, and decrypts the obtained data according to the target encryption key.

S303: If the obtained data contains predefined sensitive data, the device 12 to which the target access address belongs performs data desensitization processing on the decrypted data, and sends the desensitized data to the device 11 to which the first application belongs.

In some embodiments, if the target application identifier of the second application includes primary identification information and secondary identification information, the device 12 to which the target access address belongs may also determine whether the target application identifier carried in the sharing request is the secondary identification information of the second application. If the target application identifier carried in the sharing request is the secondary identification information of the second application, it may be considered that the data of a certain application needs to be shared with other applications at this time. In order to ensure the security of the data, the type of the sharing request may be determined as a data read request or a data write request according to the above embodiments. Based on the type of the sharing request and the pre-stored first application's access permission to the data of the second application, it is determined whether the sharing request complies with the access permission. If the sharing request complies with the access permission, subsequent steps, such as determining the target database 13 corresponding to the target application identifier according to the stored correspondence between application identifiers and databases, are performed.

For ease of understanding, the data sharing process provided by the disclosure is described below through another specific embodiment. FIG. 4 shows a schematic diagram of a third data sharing process in accordance with some embodiments. The process includes the following steps.

S401: The device 11 to which the first application belongs determines the target access address corresponding to the target application identifier of the second application according to the pre-stored correspondence between application identifiers and access addresses, and sends a sharing request for sharing the data of the second application to the target access address, where the sharing request carries the target application identifier.

S402: The device 12 to which the target access address belongs receives the sharing request, and when the target application identifier of the second application includes primary identification information and secondary identification information, determines whether the target application identifier carried in the sharing request is the secondary identification information of the second application. If the target application identifier carried in the sharing request is the secondary identification information of the second application, proceed to S403.

S403: If it is determined that the type of the sharing request is a data read request and the sharing request complies with the access permission, the device 12 to which the target access address belongs determines the target database 13 corresponding to the target application identifier according to the stored correspondence between application identifiers and databases, obtains the data stored in the target database 13, determines the target encryption key corresponding to the target application identifier according to the stored correspondence between application identifiers and encryption keys, and decrypts the obtained data according to the target encryption key.

S404: If the obtained data contains predefined sensitive data, the device 12 to which the target access address belongs performs data desensitization processing on the decrypted data, and sends the desensitized data to the device 11 to which the first application belongs.

Embodiment 2

Considering that traditional data protection mainly focuses on encrypting and protecting data when it is transmitted and written to storage media. The existing security protection capabilities for application data in the computing state (i.e., the use state) are insufficient, resulting in the lack of the most important link in the data security chain. Therefore, there is an urgent need to ensure the security of application data in the computing state. However, there is no existing good technical solution regarding how to ensure the security of application data in the computing state. The embodiments of the disclosure provide technical solutions that may ensure the security of application data in the computing state. For ease of understanding, the following embodiments are used to illustrate the security of the data of the second application (e.g., application A) in the disclosed embodiments.

In some embodiments, the data sharing system may also include: a management platform and a device to which the second application (e.g., application A) belongs. In order to ensure the security of the data, the device to which the second application belongs may first send a data storage security protection request to the management platform, and the data storage security protection request may carry the name of the second application and the target access address of the second application. The management platform may receive the data storage security protection request sent by the device to which the second application belongs, and generate a target application identifier and a target encryption key corresponding to the name of the second application, and store the correspondence between the target application identifier and the target encryption key. Optionally, the target application identifier corresponding to the name of the second application generated by the management platform may include the primary identification information and the secondary identification information mentioned in the above-described embodiments. It may be understood that the primary identification information and the secondary identification information may correspond to the same target encryption key.

In some embodiments, the device 12 to which the target access address belongs may send a key acquisition request to the management platform to obtain the target encryption key corresponding to the second application. After receiving the key acquisition request, the management platform may determine a target encryption key corresponding to the target application identifier of the second application according to the stored correspondence between application identifiers and encryption keys, and send the target encryption key to the device 12 to which the target access address belongs. The device 12 to which the target access address belongs may receive the target encryption key and store the correspondence between the target encryption key and the target application identifier.

For ease of understanding, the data sharing process provided by the disclosure is described below through a specific embodiment. FIG. 5 shows a schematic diagram of a fourth data sharing process in accordance with some embodiments. The process includes the following steps.

S501: The device to which the second application (e.g., application A) belongs sends a data storage security protection request to the management platform, where the data storage security protection request carries a name of the second application and the target access address of the second application.

S502: The management platform receives the data storage security protection request sent by the device to which the second application belongs, generates a target application identifier and a target encryption key corresponding to the name of the second application, and stores the correspondence between the target application identifier and the target encryption key.

S503: The device 12 to which the target access address belongs sends a key acquisition request to the management platform to obtain the target encryption key corresponding to the second application. After receiving the key acquisition request, the management platform determines a target encryption key corresponding to the target application identifier of the second application according to the stored correspondence between application identifiers and encryption keys, and sends the target encryption key to the device 12 to which the target access address belongs. The device 12 to which the target access address belongs receives the target encryption key and stores the correspondence between the target encryption key and the target application identifier.

S504: The device to which the first application (e.g., application B) belongs sends a request for sharing data of the second application to the management platform, where the request carries the application identifier of the first application itself.

S505: The management platform receives the request and sends the request to the device to which the second application belongs. The device to which the second application belongs receives the request and displays the application identifier of the first application carried in the request. If a confirmation note is received to agree to share data with the first application, the confirmation note is sent to the management platform. The management platform receives the confirmation note and sends the stored target application identifier of the second application (e.g., the secondary identification information) and the target access address corresponding to the target application identifier to the device 11 to which the first application belongs.

S506: The device 11 to which the first application belongs stores the correspondence between the target application identifier and the target access address. The device 11 to which the first application belongs determines the target access address corresponding to the target application identifier of the second application according to the pre-stored correspondence between application identifiers and access addresses, and sends a sharing request for sharing the data of the second application to the target access address, where the sharing request carries the target application identifier.

S507: The device 12 to which the target access address belongs receives the sharing request, and determines the target database 13 corresponding to the target application identifier according to the stored correspondence between application identifiers and databases, obtains the data stored in the target database 13, determines a target encryption key corresponding to the target application identifier according to the stored correspondence between application identifiers and encryption keys, decrypts the obtained data according to the target encryption key, and sends the decrypted data to the device 11 to which the first application belongs.

In some embodiments, in order to improve the security of encryption keys, the encryption keys stored in the management platform may be stored in the trusted execution environment (TEE) of the management platform. Taking the target encryption key of the second application as an example, the target encryption key stored in the management platform may be stored in the TEE of the management platform. In addition, the encryption keys stored in the device 12 to which the target access address belongs may also be stored in the TEE of the device 12 to which the target access address belongs. Taking the target encryption key of the second application as an example, the target encryption key may also be stored in the TEE of the device 12 to which the target access address belongs.

In some embodiments, in order to further improve the security of the stored encryption keys, the management platform may also encrypt the encryption keys of each application according to configured TEE physical storage root keys (referred to as the first TEE physical storage root keys for the convenience of description) and store these keys in its own TEE. In other words, an encryption key stored in the management platform may be a key encrypted according to a configured first TEE physical storage root key. Optionally, when the management platform sends the target encryption key to the device 12 to which the target access address belongs, if the target encryption key stored in the management platform is a key encrypted according to a configured first TEE physical storage root key, the management platform may decrypt the target encryption key according to the configured first TEE physical storage root key, and send the decrypted target encryption key to the device 12 to which the target access address belongs.

In some embodiments, in order to increase the security of the target encryption key, when the management platform sends the target encryption key to the device 12 to which the target access address belongs, the management platform may send the target encryption key to the device 12 to which the target access address belongs through a temporarily established secure channel. In some embodiments, when the target encryption key is sent to the device 12 to which the target access address belongs through the temporarily established secure channel, in order to further increase the security of the target encryption key, the management platform and the device 12 to which the target access address belongs may negotiate a temporary secure channel key, and the management platform may encrypt the target encryption key according to the temporary secure channel key, and send the encrypted target encryption key to the device 12 to which the target access address belongs through the temporarily established secure channel. When the device 12 to which the target access address belongs receives the target encryption key encrypted according to the temporary secure channel key, the device 12 to which the target access address belongs may decrypt the target encryption key according to the corresponding temporary secure channel key to obtain the decrypted target encryption key. In some embodiments, the device 12 to which the target access address belongs may also encrypt the target encryption key according to a configured second TEE physical storage root key, and then store the encrypted target encryption key.

For ease of understanding, the data sharing process provided by the disclosure is described below through another specific embodiment. FIG. 6 shows a schematic diagram of a fifth data sharing process in accordance with some embodiments. The process includes the following steps.

S601: The device to which the second application belongs sends a data storage security protection request to the management platform, where data storage security protection request carries the name of the second application and the target access address of the second application.

S602: The management platform receives the data storage security protection request sent by the device to which the second application belongs, generates a target application identifier and a target encryption key corresponding to the name of the second application, encrypts the target encryption key according to a configured first TEE physical storage root key, stores the encrypted target encryption key in the TEE of the management platform, and stores the correspondence between the target application identifier and the target encryption key.

Since the target encryption key is generated and stored in the TEE, and is encrypted according to the first TEE physical storage root key before being stored, it may be ensured that the plain text of the encryption key does not leave the TEE, thereby ensuring the security of the TEE.

S603: The device 12 to which the target access address belongs sends a key acquisition request to the management platform to obtain the target encryption key corresponding to the second application. The management platform receives the key acquisition request sent by the device 12 to which the target access address belongs, and determines the target encryption key corresponding to the target application identifier of the second application according to the stored correspondence between application identifiers and encryption keys. The management platform decrypts the target encryption key according to the first TEE physical storage root key, and encrypts the target encryption key according to the temporary secure channel key negotiated with the device 12 to which the target access address belongs, and sends the encrypted target encryption key to the device 12 to which the target access address belongs through the temporarily established secure channel.

Compared with the existing technologies in which the plain text of an encryption key appears in the application memory outside the encryption machine and the security of the encryption key during transmission cannot be guaranteed, the disclosure not only can generate and store the target encryption key in the TEE, but also encrypt the target encryption key according to the first TEE physical storage root key and then store it, ensuring that the plain text of the encryption key does not leave the TEE, thereby ensuring the security of the TEE. In addition, the disclosure may also send the target encryption key to the device 12 to which the target access address belongs according to a secure channel, thereby ensuring the security of the target encryption key during transmission. In addition, when the disclosure sends the target encryption key through the secure channel, it may also encrypt the target encryption key according to a temporary secure channel key and then send it, thereby further ensuring that the plain text of the target encryption key is not leaked during transmission, thereby further ensuring the security of the target encryption key during transmission.

S604: The device 12 to which the target access address belongs receives the target encryption key encrypted according to the temporary secure channel key, decrypts the target encryption key according to the temporary secure channel key, and encrypts the target encryption key according to the configured second TEE physical storage root key, stores the encrypted target encryption key in the TEE of the device 12 to which the target access address belongs, and stores the correspondence between the target encryption key and the target application identifier.

Since the device 12 to which the target access address belongs may store the target encryption key in the TEE, and encrypt the target encryption key according to the second TEE physical storage root key before storing the key, it may be ensured that the plaintext of the encryption key does not leave the TEE, and the security of the TEE may be guaranteed.

In the embodiments of the disclosure, the entire life cycle of an encryption key, including its generation, transmission, and storage, is carried out in the TEE and encrypted state. The plaintext of the encryption key does not leave the TEE, which may ensure the security of the encryption key.

In some embodiments, after receiving the data storage security protection request sent by the device to which the second application belongs and generating the target application identifier corresponding to the name of the second application, the management platform may send the target application identifier to the device to which the second application belongs. Exemplarily, the primary identification information in the target application identifier may be sent to the device to which the second application belongs.

In some embodiments, when the second application needs to write data into a corresponding database (e.g., target database 13), the device to which the second application belongs may send a data write request to the target access address, and the data write request carries the data to be written into database and the target application identifier (e.g., the primary identification information) of the second application. The device 12 to which the target access address belongs may receive the data write request, and determine the target encryption key corresponding to the target application identifier according to the stored correspondence between application identifiers and encryption keys, encrypt the data to be written into database according to the target encryption key, and store the encrypted data in the corresponding target database 13. In some embodiments, in order to achieve fine encryption of the data to be written into database and increase the flexibility of encryption, the management personnel of the second application may also set corresponding encryption policies, such as the fields to be encrypted, the encryption algorithms used, encryption rules, etc., where the encryption policies may be flexibly set according to the needs, which is not specifically limited in the disclosure. The data storage security protection request sent by the device to which the second application belongs to the management platform may carry an encryption policy. Optionally, the device 12 to which the target access address belongs may send an encryption policy request for the second application to the management platform, and the encryption policy request may carry the target application identifier corresponding to the second application. If the data storage security protection request carries the encryption policy for the data, the management platform may send the encryption policy to the device 12 to which the target access address belongs. The device 12 to which the target access address belongs receives the encryption policy sent by the management platform and stores the correspondence between the target application identifier and the encryption policy. If a data write request sent by the device to which the second application belongs is received, the device 12 to which the target access address belongs may determine a target encryption policy corresponding to the target application identifier according to the stored correspondence between application identifiers and encryption policies, and encrypt the data to be written into database according to the target encryption key and the target encryption policy.

Figure 7:
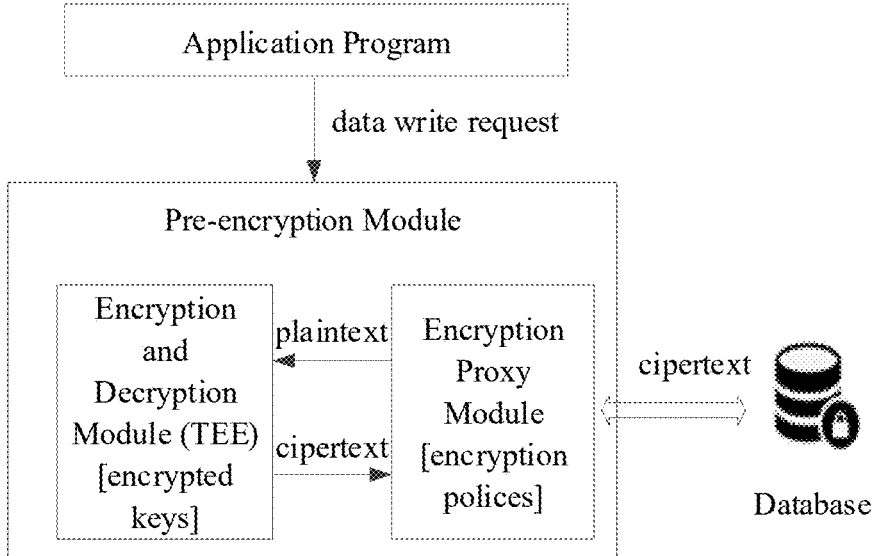
FIG. 7 shows a schematic diagram of a data writing process in accordance with some embodiments.

Exemplarily, FIG. 7 shows a schematic diagram of a data writing process in accordance with some embodiments. As shown in FIG. 7, the device to which the second application belongs (referred to as an application program in the figure for ease of description) sends a data write request to a target access address (referred to as a pre-encryption module in the figure). The data write request carries the data to be written into database and the target application identifier of the second application.

Optionally, the device 12 to which the target access address belongs (pre-encryption module) includes an encryption and decryption module and an encryption proxy module, where the encryption and decryption module may be deployed in the TEE of the device 12 to which the target access address belongs, and an encryption key (e.g., the target encryption key) is stored in the encryption and decryption module. Subsequently, the corresponding data may be encrypted or decrypted in the TEE according to the target encryption key to ensure the security of the data and the encryption key.

In some embodiments, the encryption proxy module may intercept and parse a data write request, namely, structured query language (SQL), where SQL is a database query and programming language that may be used to access data and the like. The encryption proxy module may determine a target encryption policy corresponding to the target application identifier of the second application according to the stored correspondence between application identifiers and encryption policies. The encryption proxy module may determine sub-data that needs to be encrypted in the data to be written to the database according to the target encryption policy, and may extract the sub-data, that needs to be encrypted, from the data to be written to the database, and send the plaintext data of the sub-data, that needs to be encrypted, in the data to be written to the database and the target application identifier of the second application to the encryption and decryption module. After the encryption and decryption module receives the sub-data that needs to be encrypted and the target application identifier, the encryption and decryption module may determine the target encryption key corresponding to the target application identifier according to the stored correspondence between application identifiers and encryption keys, and encrypt the sub-data that needs to be encrypted in the TEE according to the target encryption key, and return the ciphertext data of the encrypted sub-data to the encryption proxy module. The encryption proxy module rejoins the encrypted sub-data into the data to be written into database, that is, a part of the sub-data in the data written into the database may be encrypted ciphertext data. Apparently, all the sub-data in the data written into the database may also be encrypted, which may be flexibly set according to needs, which is not specifically limited in the disclosure. The encryption proxy module may store the data, encrypted according to the target encryption key and the target encryption policy, into the corresponding target database 13.

When an application (e.g., the second application) of the disclosure uses the database security storage service, the application just needs to modify the database access address (e.g., target access address) in the database configuration file to point to the pre-encryption module (i.e., the device 12 to which the target access address belongs), and then the existing database interface may be directly called through the target access address. The application (e.g., the second application) accesses the database (e.g., the target database 13) through the pre-encryption module first. The pre-encryption module intercepts and parses the SQL statement and matches the encryption policy, and encrypts the data (e.g., data to be written into database) in the TEE, and then sends the encrypted data (which is ciphertext) to the target database 13 for corresponding processing and storage. Compared with the existing technologies in which the plain text is sent to the database for corresponding processing and only the processing result is encrypted and stored in the database, since the disclosure sends the encrypted data to the database for corresponding processing, even database privileged accounts or operation and maintenance personnel may not access the plain text data of the application at the database level, thereby more effectively protecting the security of the computation and storage of user privacy data.

In addition, the data sharing methods provided by the disclosure are compatible with existing databases. There is no need to change an existing database client calling interface and server database system to change the data processing in a databases from plain text to cipher text to realize a confidential database. Even database privileged accounts or operation and maintenance personnel may not access the plain text data of the application at the database level, which may conveniently and effectively ensure the security of the computation and storage of user privacy data.

In some embodiments, when the second application needs to read data, the device to which the second application belongs may send a data read request to the target access address, and the data read request may carry the target application identifier of the second application. The device 12 to which the target access address belongs receives the data read request, and may determine the target database 13 corresponding to the target application identifier according to the stored correspondence between application identifiers and databases. The device 12 to which the target access address belongs may then obtain the data stored in the target database 13, and determine the target encryption key corresponding to the target application identifier according to the stored correspondence between application identifiers and encryption keys, decrypt the obtained data according to the target encryption key, and send the decrypted data to the device to which the second application belongs.

In some embodiments, similar to the above-described embodiments, the device 12 to which the target access address belongs may send an encryption policy request for the second application to the management platform, and the encryption policy request may carry the target application identifier corresponding to the second application. If the data storage security protection request sent by the device to which the second application belongs carries an encryption policy for the data, the management platform may send the encryption policy to the device 12 to which the target access address belongs. The device 12 to which the target access address belongs receives the encryption policy and stores the correspondence between the target application identifier and the encryption policy. If the data read request sent by the device to which the second application belongs is subsequently received, the device 12 to which the target access address belongs may determine the target encryption policy corresponding to the target application identifier according to the stored correspondence between application identifiers and encryption policies, and decrypt the data obtained from the target database 13 according to the target encryption key and the target encryption policy, and send the decrypted data to the device to which the second application belongs.

Figure 8:
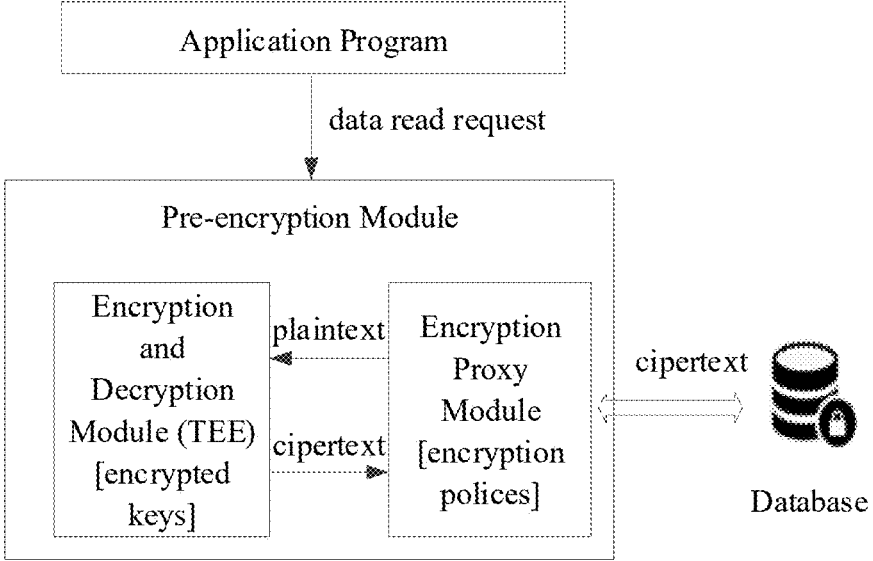
FIG. 8 shows a schematic diagram of a data reading process in accordance with some embodiments.

Exemplarily, FIG. 8 shows a schematic diagram of a data reading process in accordance with some embodiments. As shown in FIG. 8, the device to which the second application belongs (referred to as the application program in the figure) sends a data read request to the target access address (referred to as the pre-encryption module in the figure), and the data read request carries the target application identifier of the second application. Optionally, the device 12 to which the target access address belongs (i.e., the pre-encryption module) includes an encryption and decryption module and an encryption proxy module, where the encryption proxy module may intercept and parse the data reading request, i.e., SQL.

The encryption proxy module determines the target database 13 corresponding to the target application identifier according to the stored correspondence between application identifiers and databases, and obtains the data stored in the target database 13. The encryption proxy module determines the target encryption policy corresponding to the target application identifier of the second application according to the stored correspondence between application identifiers and encryption policies. The encryption proxy module may determine the sub-data encrypted from the data obtained from the target database 13 according to the target encryption policy, extract the encrypted sub-data from the data, and send the encrypted sub-data and the target application identifier of the second application to the encryption and decryption module. After receiving the encrypted sub-data and the target application identifier, the encryption and decryption module may determine the target encryption key corresponding to the target application identifier according to the stored correspondence between application identifiers and encryption keys, decrypt the encrypted sub-data according to the target encryption key, and return the plaintext data of the decrypted sub-data to the encryption proxy module. The encryption proxy module then rejoins the decrypted sub-data to the data obtained from the target database 13, and the encryption proxy module may send the decrypted data to the device to which the second application belongs.

Similarly, as in the above embodiments, the device 12 to which the target access address belongs sends an encryption policy request for the second application to the management platform, and the encryption policy request carries the target application identifier corresponding to the second application. If the data storage security protection request sent by the device to which the second application belongs carries the encryption policy for the data, the management platform sends the encryption policy to the device 12 to which the target access address belongs. The device 12 to which the target access address belongs receives the encryption policy, and after storing the correspondence between the target application identifier and the encryption policy, if the device 12 to which the target access address belongs receives a sharing request sent by the device to which the first application belongs, the device 12 to which the target access address belongs may determine the target encryption policy corresponding to the target application identifier according to the stored correspondence between application identifiers and encryption policies. Based on the target encryption key and the target encryption policy, the data obtained from the target database 13 is decrypted, and the decrypted data is sent to the device to which the first application belongs. Here, the process of decrypting the data obtained from the target database 13 according to the target encryption key and the target encryption policy is the same as in the above embodiments, which will not be repeated here.

Figure 9:
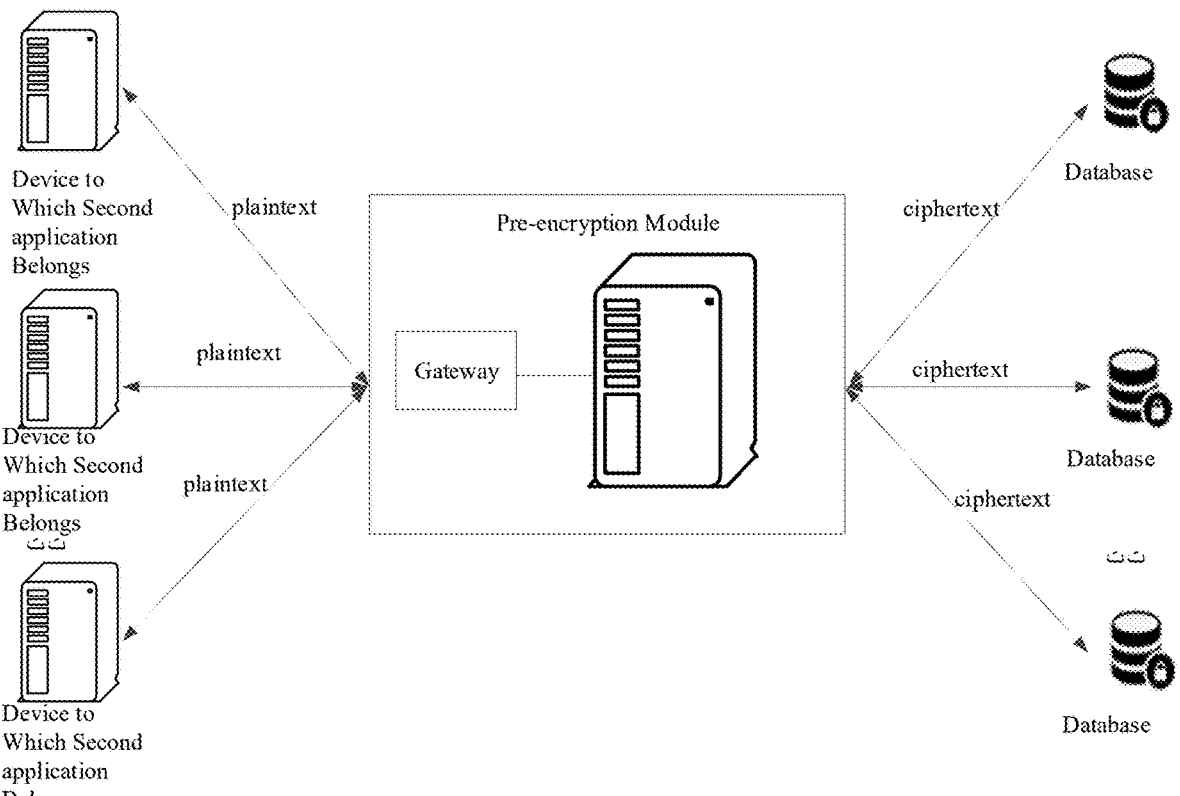
FIG. 9 shows a schematic diagram of a data security storage process in accordance with some embodiments.

In some embodiments, the device 12 to which the target access address belongs (i.e., the pre-encryption module) may be integrated into the device to which the second application belongs, or the device 12 to which the target access address belongs (i.e., the pre-encryption module) may be deployed in an encryption gateway cluster. Exemplarily, when the secure storage service is provided only for one application, the device 12 to which the target access address belongs (i.e., the pre-encryption module) may be integrated into the device to which the application belongs. Referring to FIG. 9, FIG. 9 shows a schematic diagram of a data security storage process in accordance with some embodiments. When multiple applications all need to perform data storage security protection services (also referred to as security storage services), the device 12 to which the target access address belongs (i.e., the pre-encryption module) may be deployed in an encryption gateway cluster. That is, when there are multiple second applications, for each device to which a second application belongs, a data write request may be sent to the device 12 to which the target access address belongs (i.e., the pre-encryption module) deployed in the encryption gateway cluster. The data to be written into database carried in the data write request is plain text data. For each second application, the device 12 to which the target access address belongs (i.e., the pre-encryption module) may determine the target encryption key corresponding to the target application identifier of the second application according to the stored correspondence between application identifiers and encryption keys, and encrypt the data to be written into database of the second application according to the target encryption key, and store the encrypted data (which is ciphertext) into the target database 13 corresponding to the second application. In some embodiments, different applications may correspond to different databases, that is, each application may correspond to a dedicated database.

Since for different second applications in the disclosure, the data of different second applications may be encrypted according to different encryption keys, this allows to achieve automatic and secure isolation of data between applications according to the different applications, thereby increasing data security.

In addition, each device to which a second application belongs may send a data read request to the device 12 to which the target access address belongs (i.e., the pre-encryption module) deployed in the encryption gateway cluster. For each second application, the device 12 to which the target access address belongs (i.e., the pre-encryption module) may determine the target database 13 corresponding to the target application identifier of the second application according to the stored correspondence between application identifiers and databases, and obtain the corresponding data of the second application stored in the target database 13. It may be understood that the data obtained from the database is encrypted data, that is, ciphertext data, the device 12 to which the target access address belongs (i.e., the pre-encryption module) determines the target encryption key corresponding to the target application identifier of the second application according to the stored correspondence between application identifiers and encryption keys, decrypts the obtained data according to the target encryption key, and sends the decrypted data (which is plaintext) to the device to which the second application belongs.

In some embodiments, the management platform may be deployed in a separate device, or may be deployed in the device 11 to which the first application belongs or in the device to which the second application belongs, which is not specifically limited in the disclosure and may be flexibly configured according to needs.

Figure 10:
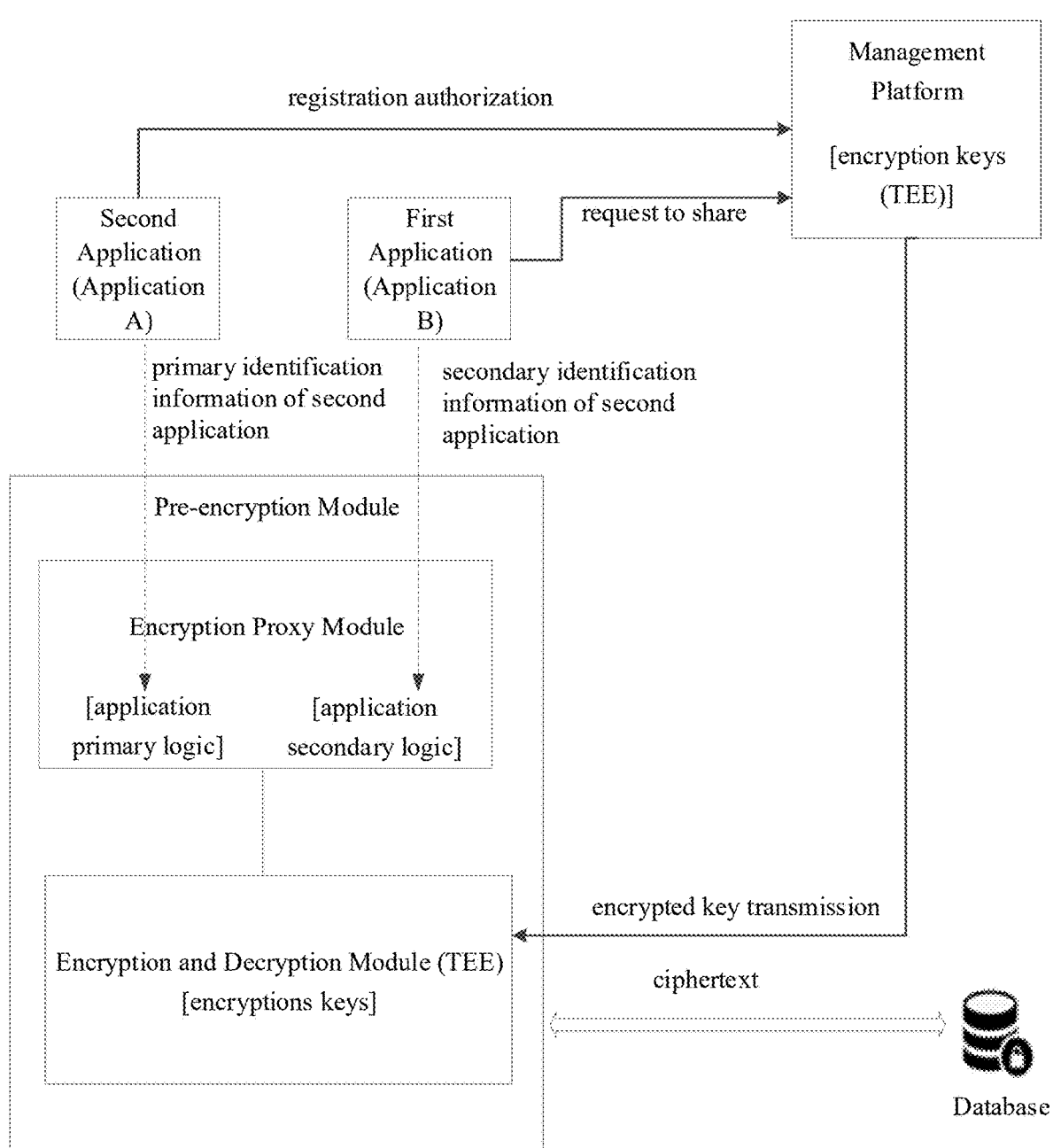
FIG. 10 shows a schematic diagram of a data sharing scenario in accordance with some embodiments of the disclosure.

For ease of understanding, the data sharing process provided by the disclosure is illustrated below through a specific embodiment. FIG. 10 shows a schematic diagram of a data sharing scenario in accordance with some embodiments of the disclosure. As shown in FIG. 10, the process may include: (1) the second application (e.g., application A) registration authorization process, (2) the target encryption key transmission process, (3) the second application writing or reading data process, (4) the first application (e.g., application B) requesting to share the data of the second application, (5) the first application sharing the data of the second application, etc.

Here, the second application (e.g., application A) registration authorization process (1) may include the following.

The device to which the second application belongs sends a data storage security protection request to the management platform, and the data storage security protection request carries the name of the second application and the target access address of the second application. The management platform receives the data storage security protection request, generates a target application identifier and a target encryption key corresponding to the name of the second application, and stores the correspondence between the target application identifier and the target encryption key. Optionally, the generated target encryption key may be stored in the TEE of the management platform. Optionally, the target application identifier generated by the management platform includes primary identification information and secondary identification information, where the primary identification information is sent to the device to which the second application belongs, and the device to which the second application belongs stores the correspondence between the primary identification information and the target access address in its database configuration file, where the target access address may be the address of the pre-encryption module.

The target encryption key transmission process (2) may include the following.

The device 12 to which the target access address belongs (i.e., the pre-encryption module) sends a key acquisition request to the management platform to obtain the target encryption key corresponding to the second application. The management platform receives the key acquisition request, determines the target encryption key corresponding to the target application identifier of the second application according to the stored correspondence between application identifiers and encryption keys, and sends the target encryption key to the device 12 to which the target access address belongs through an established secure encryption channel. The device 12 to which the target access address belongs receives the target encryption key, stores the target encryption key in the TEE, and stores the correspondence between the target encryption key and the target application identifier of the second application.

The process (3) of the second application writing or reading data may include the following.

The process of the second application writing data is as follows: the device to which the second application belongs sends a data write request to the target access address, and the data write request carries the data to be written into database and the target application identifier (e.g., the primary identification information) of the second application. The encryption proxy module in the device 12 to which the target access address belongs (i.e., the pre-encryption module) receives the data write request, and identifies that the target application identifier carried in the data write request is the primary identification information of the second application. Then, the data write request may be considered as a compliant request for the second application to write data into a database corresponding to the second application itself, and the corresponding data writing process may be performed according to the application's primary logic (or primary schema), that is, the data (which is plain text) to be written into the database may be sent to the encryption and decryption module in the device 12 to which the target access address belongs (i.e., the pre-encryption module). The encryption and decryption module is configured in the TEE, and the encryption keys are stored in the encryption and decryption module. The encryption and decryption module determines a target encryption key corresponding to the target application identifier according to the stored correspondence between application identifiers and encryption keys, encrypts the data to be written into database according to the target encryption key, and sends the encrypted data (which is ciphertext) to the encryption proxy module, which stores the encrypted data in a target database 13 corresponding to the second application.

The process of the second application reading data is as follows: the device to which the second application belongs sends a data read request to the target access address, and the data read request carries the target application identifier (e.g., the primary identification information) of the second application. The encryption proxy module in the device 12 to which the target access address belongs (i.e., the pre-encryption module) receives the data read request, and identifies that the target application identifier carried in the data read request is the primary identification information of the second application. Then, the data read request may be considered as a compliance request for the second application to read the data in the database corresponding to the second application itself, and the corresponding data reading process may be performed according to the application's primary logic (or primary schema). That is, the target database 13 corresponding to the target application identifier may be determined according to the stored correspondence between application identifiers and databases, and the data stored in the target database 13 is obtained. The encryption proxy module sends the obtained data (which is ciphertext) to the encryption and decryption module, and the encryption and decryption module determines the target encryption key corresponding to the target application identifier according to the stored correspondence between application identifiers and encryption keys, decrypts the obtained data according to the target encryption key, and sends the decrypted data to the encryption proxy module, and the encryption proxy module sends the decrypted data to the device to which the second application belongs.

The process (4) of the first application (e.g., application B) requesting to share the data of the second application may include the following.

The device to which the first application (e.g., application B) belongs sends a request to the management platform for sharing the data of the second application (e.g., application A), and the request carries the application identifier of the first application. The management platform receives the request and sends the request to the device to which the second application belongs. The device to which the second application belongs receives the request and displays the application identifier of the first application carried in the request. If a confirmation note is received to agree to share data with the first application, the confirmation note is sent to the management platform. The management platform receives the confirmation note and sends the secondary identification information in the target application identifier of the second application and the target access address corresponding to the target application identifier to the device 11 to which the first application belongs. The device 11 to which the first application belongs stores the correspondence between the secondary identification information of the second application and the target access address.

The process (5) of the first application sharing the data of the second application may include the following.

The device to which the first application (e.g., application B) belongs determines the target access address corresponding to the target application identifier (e.g., secondary identification information) of the second application according to the pre-stored correspondence between application identifiers and access addresses, and sends a sharing request for sharing the data of the second application to the target access address, where the sharing request carries the target application identifier (e.g., secondary identification information).

The encryption proxy module in the terminal of the device 12 to which the target access address belongs determines whether the target application identifier carried in the sharing request is the secondary identification information of the second application. If the target application identifier carried in the sharing request is the secondary identification information of the second application, the corresponding data sharing process is performed according to the application's secondary logic (or secondary schema), that is, it may be determined whether the type of the sharing request is a data read request or a data write request. If the sharing request is a data read request, and the pre-stored access permission of the first application to the data of the second application includes that the first application may read the data of the second application, then it is considered that the sharing request meets the access permission, and the target database 13 corresponding to the target application identifier may be determined according to the stored correspondence between application identifiers and databases, the data stored in the target database 13 is obtained. The encryption proxy module sends the data obtained from the target database 13 to the encryption and decryption module. The encryption and decryption module determines the target encryption key corresponding to the target application identifier according to the stored correspondence between application identifiers and encryption keys, decrypts the obtained data according to the target encryption key, and sends the decrypted data to the encryption proxy module. The encryption proxy module sends the decrypted data to the device 11 to which the first application belongs.

Embodiment 3

Based on the similar technical concepts, the disclosure provides a data sharing method, which is applied to a device to which a first application belongs. FIG. 11 shows a schematic diagram of a sixth data sharing process in accordance with some embodiments. The data sharing process includes the following steps.

S1101: Determine a target access address corresponding to a target application identifier of a second application according to a pre-stored correspondence between application identifiers and access addresses, and send a sharing request for sharing data of the second application to the target access address, where the sharing request carries the target application identifier.

S1102: Receive decrypted data of the second application sent by a device to which the target access address belongs.

The device to which the first application belongs may be a PC, a mobile terminal or other devices, or may be a server or other devices.

In some embodiments, before determining the target access address corresponding to the target application identifier of the second application according to the pre-stored correspondence between application identifiers and access addresses, the method further includes the following.

Send a request for sharing data of the second application to a management platform, where the request carries an application identifier of the first application.

If the target application identifier of the second application and the target access address corresponding to the target application identifier are received from the management platform, store a correspondence between the target application identifier and the target access address.

Based on the similar technical concepts, the disclosure provides a data sharing method, which is applied to a device to which the target access address belongs. FIG. 12 shows a schematic diagram of a seventh data sharing process in accordance with some embodiments. The data sharing process includes the following steps.

S1201: Receive a sharing request sent by a device to which a first application belongs, where the sharing request carries a target application identifier.

S1202: Determine a target database corresponding to the target application identifier according to a stored correspondence between application identifiers and databases, and obtain data stored in the target database.

S1203: Determine a target encryption key corresponding to the target application identifier according to a stored correspondence between application identifiers and encryption keys, decrypt the obtained data according to the target encryption key, and send the decrypted data to the device to which the first application belongs.

The device to which the target access address belongs may be a PC, a mobile terminal or other devices, or may be a server or other devices.

In some embodiments, after receiving the sharing request sent by the device to which the first application belongs and before determining the target database corresponding to the target application identifier according to the stored correspondence between application identifiers and databases, the method further includes the following.

Determine whether the type of the sharing request is a data read request or a data write request, and according to the type of the sharing request and a pre-stored access permission of the first application to the data of the second application, determine whether the sharing request complies with the access permission, and if the sharing request complies with the access permission, perform the subsequent step of determining the target database corresponding to the target application identifier according to the stored correspondence between application identifiers and databases.

In some embodiments, after decrypting the obtained data according to the target encryption key and before sending the decrypted data to the device to which the first application belongs, the method further includes the following.

If the obtained data contains predefined sensitive data, desensitize the decrypted data.

The step of sending the decrypted data to the device to which the first application belongs includes the following.

Send the data after the data desensitization processing to the device to which the first application belongs.

In some embodiments, after receiving the sharing request sent by the device to which the first application belongs and before determining whether the type of the sharing request is a data read request or a data write request, the method further includes the following.

If the target application identifier of the second application includes primary identification information and secondary identification information, determine whether the target application identifier carried in the sharing request is the secondary identification information of the second application, and if the target application identifier carried in the sharing request is the secondary identification information of the second application, perform subsequent steps.

In some embodiments, before receiving the sharing request sent by the device to which the first application belongs, the method further includes the following.

Send a key acquisition request to the management platform to obtain a target encryption key corresponding to the second application.

If the target encryption key corresponding to the second application sent by the management platform is received, store a correspondence between the target encryption key and the target application identifier.

In some embodiments, after receiving the target encryption key corresponding to the second application sent by the management platform and before storing the correspondence between the target encryption key and the target application identifier, the method further includes the following.

If the received target encryption key is a target encryption key encrypted according to a temporary secure channel key negotiated with the management platform, decrypt the target encryption key according to the temporary secure channel key.

In some embodiments, storing the target encryption key includes the following.

Encrypt the target encryption key according to a configured second TEE physical storage root key, and store the encrypted target encryption key.

In some embodiments, the method further includes the following.

Receive a data write request sent by a device to which a second application belongs, where the data write request carries data to be written into database and a target application identifier of the second application.

According to the stored correspondence between application identifiers and encryption keys, determine the target encryption key corresponding to the target application identifier, encrypt the data to be written into database according to the target encryption key, and store the encrypted data in the corresponding target database.

In some embodiments, encrypting the data to be written into database according to the target encryption key includes the following.

According to the pre-stored correspondence between application identifiers and encryption policies, determine a target encryption policy corresponding to the target application identifier, and encrypt the data to be written into database according to the target encryption key and the target encryption policy.

In some embodiments, the method further includes the following.

Receive a data read request sent by the device to which the second application belongs, where the data read request carries the target application identifier of the second application.

Determine a target database corresponding to the target application identifier according to the stored correspondence between application identifiers and databases, and obtain the data stored in the target database.

According to a stored correspondence between application identifiers and encryption keys, determine a target encryption key corresponding to the target application identifier, decrypt the obtained data according to the target encryption key, and send the decrypted data to the device to which the second application belongs.

In some embodiments, decrypting the obtained data according to the target encryption key includes the following.

Determine a target encryption policy corresponding to the target application identifier according to the pre-stored correspondence between application identifiers and encryption policies.

Decrypt the obtained data according to the target encryption key and the target encryption policy.

Based on the similar technical concepts, the disclosure provides a data sharing method, which is applied to a device to which the second application belongs. FIG. 13 shows a schematic diagram of an eighth data sharing process in accordance with some embodiments. The data sharing process includes the following steps.

S1301: If a request sent by a management platform is received, display an application identifier of a first application carried in the request.

S1302: If a confirmation note for agreeing the first application to share data is received, send the confirmation note to the management platform.

The device to which the second application belongs may be a PC, a mobile terminal or other devices, or may be a server or other devices.

In some embodiments, the method further includes the following.

Send a data storage security protection request to the management platform, where the data storage security protection request carries the name of the second application and the target access address of the second application.

In some embodiments, the method further includes the following.

Send a data write request to the target access address, where the data write request carries data to be written into database and a target application identifier of the second application.

In some embodiments, the method further includes the following.

Send a data read request to the target access address, where the data read request carries a target application identifier of the second application.

Receive decrypted data sent by the device to which the target access address belongs.

Based on the similar technical concepts, the disclosure provides a data sharing method, which is applied to a management platform. FIG. 14 shows a schematic diagram of a ninth data sharing process in accordance with some embodiments. The data sharing process includes the following steps.

S1401: Receive a request, for sharing data of a second application, sent by a device to which a first application belongs, where the request carries an application identifier of the first application.

S1402: Send the request to a device to which the second application belongs.

S1403: If a confirmation note, for agreeing to share data with the first application, is received from the device to which the second application belongs, send the stored target application identifier of the second application and the target access address corresponding to the target application identifier to the device to which the first application belongs.

In some embodiments, before receiving the request for sharing data of the second application sent by the device to which the first application belongs, the method further includes the following.

Receive a data storage security protection request sent by the device to which the second application belongs, where the data storage security protection request carries a name of the second application and a target access address of the second application.

Receive the data storage security protection request, generate a target application identifier and a target encryption key corresponding to the name of the second application, and store a correspondence between the target application identifier and the target encryption key.

If a key acquisition request for obtaining the target encryption key corresponding to the second application is received from a device to which the target access address belongs, determine a target encryption key corresponding to the target application identifier of the second application according to the stored correspondence between application identifiers and encryption keys, and send the target encryption key to the device to which the target access address belongs.

In some embodiments, after determining the target encryption key corresponding to the target application identifier of the second application and before sending the target encryption key to the device to which the target access address belongs, the method further includes the following.

If the stored target encryption key is a key encrypted according to a configured first TEE physical storage root key, decrypt the target encryption key according to the first TEE physical storage root key.

Sending the target encryption key to the device to which the target access address belongs includes the following.

Send the decrypted target encryption key to the device to which the target access address belongs.

In some embodiments, sending the target encryption key to the device to which the target access address belongs includes the following.

Based on an established secure channel, send the target encryption key to the device to which the target access address belongs.

In some embodiments, sending the target encryption key to the device to which the target access address belongs through the established secure channel includes the following.

Encrypt the target encryption key according to a temporary secure channel key negotiated with the device to which the target access address belongs, and send the encrypted target encryption key to the device to which the target access address belongs through the secure channel.

In some embodiments, the method further includes the following.

Receive an encryption policy request for the second application sent by a device to which the target access address belongs, where the encryption policy request carries a target application identifier corresponding to the second application.

If the data storage security protection request sent by the device, to which the second application corresponding to the target application identifier belongs, carries an encryption policy for the data, send the encryption policy to the device to which the target access address belongs, so that the device to which the target access address belongs stores the correspondence between the target application identifier and the encryption policy.

Embodiment 4

Figure 15:
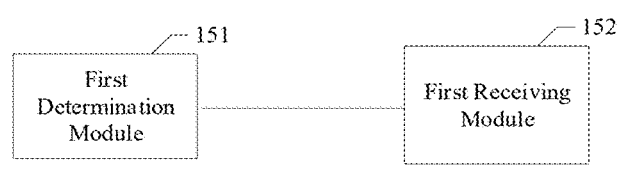
FIG. 15 shows a schematic diagram of a first data sharing apparatus in accordance with some embodiments.

Based on the similar technical concepts, the disclosure provides a data sharing apparatus, which is applied to a device to which a first application belongs. FIG. 15 shows a schematic diagram of a first data sharing apparatus in accordance with some embodiments. The apparatus includes the following.

A first determination module 151, which is configured to determine a target access address corresponding to a target application identifier of a second application according to a pre-stored correspondence between application identifiers and access addresses, and send a sharing request for sharing data of the second application to the target access address, where the sharing request carries the target application identifier.

A first receiving module 152, which is configured to receive decrypted data of the second application sent by the device to which the target access address belongs.

In some embodiments, the first determination module 151 is further configured to send a request for sharing the data of the second application to the management platform, where the request carries the application identifier of the first application, and if the target application identifier of the second application and the target access address corresponding to the target application identifier are received from the management platform, store the correspondence between the target application identifier and the target access address.

Figure 16:
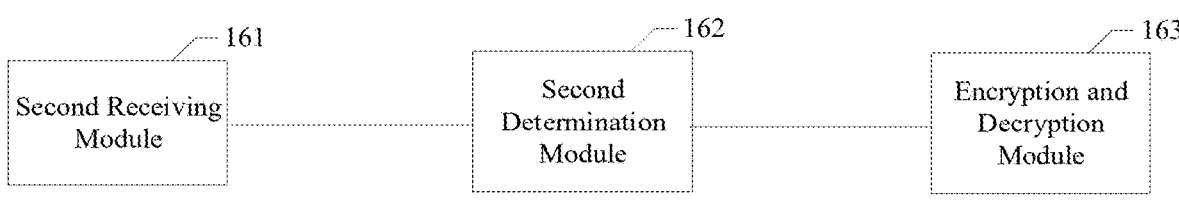
FIG. 16 shows a schematic diagram of a second data sharing apparatus in accordance with some embodiments.

Based on the similar technical concepts, the disclosure provides a data sharing apparatus, which is applied to device to which the target access address belongs. FIG. 16 shows a schematic diagram of a second data sharing apparatus in accordance with some embodiments. The apparatus includes the following.

A second receiving module 161, which is configured to receive a sharing request sent by a device to which a first application belongs, where the sharing request carries a target application identifier.

A second determination module 162, which is configured to determine a target database corresponding to the target application identifier according to a stored correspondence between application identifiers and databases, and obtain data stored in the target database.

An encryption and decryption module 163, which is configured to determine a target encryption key corresponding to the target application identifier according to a stored correspondence between application identifiers and encryption keys, decrypt the obtained data according to the target encryption key, and send the decrypted data to the device to which the first application belongs.

In some embodiments, the second determination module 162 is further configured to determine whether the type of the sharing request is a data read request or a data write request, and according to the type of the sharing request and a pre-stored access permission of the first application to the data of the second application, determine whether the sharing request complies with the access permission, and if the sharing request complies with the access permission, perform the subsequent step of determining the target database corresponding to the target application identifier according to the stored correspondence between application identifiers and databases.

In some embodiments, the encryption and decryption module 163 is further configured to perform data desensitization processing on the decrypted data if the obtained data contains predefined sensitive data, and send the data after data desensitization processing to the device to which the first application belongs.

In some embodiments, the second determination module 162 is further configured to determine whether the target application identifier carried in the sharing request is the secondary identification information of the second application if the target application identifier of the second application includes primary identification information and secondary identification information, and if the target application identifier carried in the sharing request is the secondary identification information, perform the subsequent step of determining whether the type of the sharing request is a data read request or a data write request.

In some embodiments, the second receiving module 161 is further configured to send a key acquisition request to the management platform to obtain the target encryption key corresponding to the second application, if the target encryption key corresponding to the second application sent by the management platform is received, store the correspondence between the target encryption key and the target application identifier.

In some embodiments, the second receiving module 161 is further configured to decrypt the target encryption key according to a temporary secure channel key if the received target encryption key is a target encryption key encrypted according to the temporary secure channel key negotiated with the management platform.

In some embodiments, the second receiving module 161 is specifically configured to encrypt the target encryption key according to a configured second TEE physical storage root key, and store the encrypted target encryption key.

In some embodiments, the encryption and decryption module 163 is further configured to receive a data write request sent by a device to which a second application belongs, where the data write request carries data to be written into database and the target application identifier of the second application, determine the target encryption key corresponding to the target application identifier according to the stored correspondence between application identifiers and encryption keys, encrypt the data to be written into database according to the target encryption key, and store the encrypted data in the corresponding target database.

In some embodiments, the encryption and decryption module 163 is specifically configured to determine the target encryption policy corresponding to the target application identifier according to the pre-stored correspondence between application identifiers and encryption policies, and encrypt the data to be written into database according to the target encryption key and the target encryption policy.

In some embodiments, the encryption and decryption module 163 is further configured to receive a data read request sent by a device to which a second application belongs, the data read request carrying the target application identifier of the second application, determine a target database corresponding to the target application identifier according to the stored correspondence between application identifiers and databases, obtain data stored in the target database, determine a target encryption key corresponding to the target application identifier according to the stored correspondence between application identifiers and encryption keys, decrypt the obtained data according to the target encryption key, and send the decrypted data to the device to which the second application belongs.

In some embodiments, the encryption and decryption module 163 is specifically configured to determine a target encryption policy corresponding to the target application identifier according to the pre-stored correspondence between application identifiers and encryption policies, and decrypt the obtained data according to the target encryption key and the target encryption policy.

Figure 17:
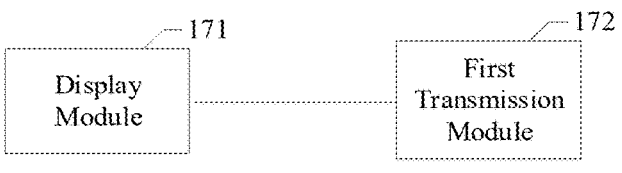
FIG. 17 shows a schematic diagram of a third data sharing apparatus in accordance with some embodiments.

Based on the similar technical concepts, the disclosure provides a data sharing apparatus, which is applied to a device to which a second application belongs. FIG. 17 shows a schematic diagram of a third data sharing apparatus in accordance with some embodiments. The apparatus includes the following.

A display module 171, which is configured to display an application identifier of a first application carried in a request if a request sent by a management platform is received.

A first transmission module 172, which is configured to send a confirmation note to the management platform if a confirmation note for agreeing the first application to share data is received.

In some embodiments, the first transmission module 172 is further configured to send a data storage security protection request to the management platform, where the data storage security protection request carries the name of the second application and the target access address of the second application.

In some embodiments, the first transmission module 172 is further configured to send a data write request to the target access address, where the data write request carries the data to be written into database and the target application identifier of the second application.

In some embodiments, the first transmission module 172 is further configured to send a data read request to the target access address, where the data read request carries the target application identifier of the second application, and receive decrypted data sent by a device to which the target access address belongs.

Figure 18:
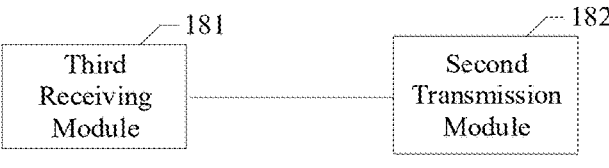
FIG. 18 shows a schematic diagram of a fourth data sharing apparatus in accordance with some embodiments.

Based on the similar technical concepts, the disclosure provides a data sharing apparatus, which is applied to a management platform. FIG. 18 shows a schematic diagram of a fourth data sharing apparatus in accordance with some embodiments. The apparatus includes the following.

A third receiving module 181, which is configured to receive a request for sharing data of a second application sent by a device to which a first application belongs, where the request carries an application identifier of the first application.

A second transmission module 182, which is configured to send the request to the device to which the second application belongs, if a confirmation note for agreeing to share data with the first application is received from the device to which the second application belongs, send the stored target application identifier of the second application and the target access address corresponding to the target application identifier to the device to which the first application belongs.

In some embodiments, the third receiving module 181 is further configured to receive a data storage security protection request sent by the device to which the second application belongs, the data storage security protection request carrying the name of the second application and the target access address of the second application, receive the data storage security protection request, generate a target application identifier and a target encryption key corresponding to the name of the second application, and store the correspondence between the target application identifier and the target encryption key, if a key acquisition request for obtaining the target encryption key corresponding to the second application is received from the device to which the target access address belongs, determine the target encryption key corresponding to the target application identifier of the second application according to the stored correspondence between application identifiers and encryption keys, and send the target encryption key to the device to which the target access address belongs.

In some embodiments, the third receiving module 181 is further configured to decrypt the target encryption key according to a first TEE physical storage root key if the stored target encryption key is a key encrypted according to the configured first TEE physical storage root key, and send the decrypted target encryption key to the device to which the target access address belongs.

In some embodiments, the third receiving module 181 is specifically configured to send the target encryption key to the device to which the target access address belongs according to an established secure channel.

In some embodiments, the third receiving module 181 is specifically configured to encrypt the target encryption key according to a temporary secure channel key negotiated with the device to which the target access address belongs, and send the encrypted target encryption key to the device to which the target access address belongs through the secure channel.

In some embodiments, the second transmission module 182 is further configured to receive an encryption policy request for the second application sent by the device to which the target access address belongs, where the encryption policy request carries the target application identifier corresponding to the second application, if the data storage security protection request sent by the device, to which the second application corresponding to the target application identifier belongs, carries an encryption policy for the data, send the encryption policy to the device to which the target access address belongs, so that the device to which the target access address belongs stores the correspondence between the target application identifier and the encryption policy.

Figure 19:
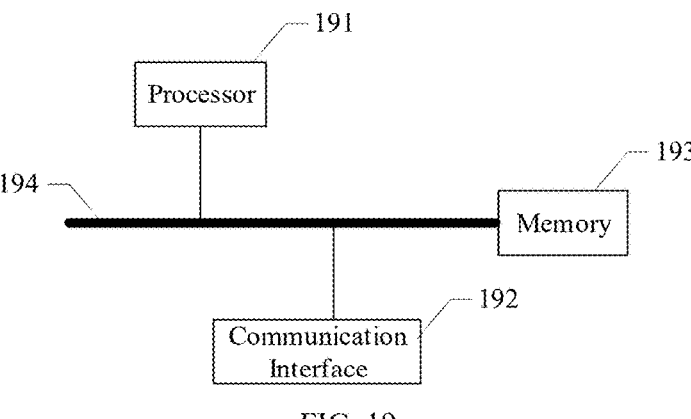
FIG. 19 shows a schematic structural diagram of an electronic device in accordance with some embodiments.

Based on the similar technical concepts, the disclosure also provides an electronic device. FIG. 19 shows a schematic structural diagram of an electronic device in accordance with some embodiments. As shown in FIG. 19, the electronic device includes: a processor 191, a communication interface 192, a memory 193 and a bus 194, where the processor 191, the communication interface 192, and the memory 193 communicate with each other through the bus 194.

In some embodiments, a computer program is stored in the memory 193, and when the program is executed by the processor 191, the processor 191 executes the steps of any one of the above data sharing methods.

Since the principle of solving the problem by the above electronic device is similar to that of the data sharing methods, the implementation of the above electronic device may refer to the implementation of the methods, and the repeated parts will not be repeated.

The bus mentioned in the electronic device may be a peripheral component interconnect (PCI) bus or an extended industry standard architecture (EISA) bus, etc. The bus may be divided into an address bus, a data bus, a control bus, etc. For ease of representation, only one thick line is used in the figure, but it does not mean that there is only one bus or one type of bus.

The communication interface 192 is configured for communication between the above electronic device and other devices.

The memory may include a random access memory (RAM) or a non-volatile memory (NVM), such as at least one disk memory. Optionally, the memory may also be at least one storage device located away from the processor.

The processor may be a general-purpose processor, including a central processing unit, a network processor (NP), etc. The processor may also be a digital signal processing processor (DSP), an application-specific inte-grated circuit, a field programmable gate array or other programmable logic devices, a discrete gate or transistor logic device, a discrete hardware component, etc.

Based on the similar technical concepts, an embodiment of the disclosure provides a computer-readable storage medium, which stores a computer program that may be executed by an electronic device. When the program runs on the electronic device, the electronic device implements the steps of any one of the above-described data sharing methods when executed.

The computer-readable storage medium may be any available medium or data storage device that may be accessed by the processor in the electronic device, including but not limited to magnetic storage such as floppy disks, hard disks, magnetic tapes, magneto-optical disks (MO), etc., optical storage such as CDs, DVDs, BDs, HVDs, etc., and semi-conductor storage such as ROMs, EPROMs, EEPROMs, non-volatile memories (NAND FLASH), solid-state drives (SSDs), etc.

Based on the similar technical concepts, on the basis of the above embodiments, the disclosure provides a computer program product, which includes computer program code. When the computer program code runs on a computer, the computer program code enables the computer to execute the steps of any of the data sharing methods described above.

Those skilled in the art will appreciate that the embodiments of the disclosure may be provided as methods, systems, or computer program products. Therefore, the disclosure may adopt the form of a complete hardware embodiment, a complete software embodiment, or an embodiment combining software and hardware. Moreover, the disclosure may adopt the form of a computer program product implemented on one or more computer-usable storage media (including but not limited to disk storage, CD-ROM, optical storage, etc.) containing computer-usable program codes.

The present disclosure is described with reference to the flowcharts and/or block diagrams of the methods, devices (systems), and computer program products according to the disclosure. It should be understood that each process and/or block in the flowcharts and/or block diagrams, as well as the combination of the processes and/or blocks in the flowcharts and/or block diagrams, may be implemented by computer program instructions. These computer program instructions may be provided to a processor of a general-purpose computer, a special-purpose computer, an embedded processor, or other programmable data processing devices to produce a machine, so that the instructions executed by the processor of the computer or other programmable data processing devices produce a device for implementing the functions specified in one or more processes in the flowcharts and/or one or more blocks in the block diagrams.

These computer program instructions may also be stored in a computer-readable memory that may direct a computer or other programmable data processing devices to work in a specific manner, so that the instructions stored in the computer-readable memory produce a manufactured product including an instruction device that implements the functions specified in one or more processes in the flowcharts and/or one or more blocks in the block diagrams.

These computer program instructions may also be loaded onto a computer or other programmable data processing devices so that a series of operational steps are executed on the computer or other programmable devices to produce a computer-implemented process, whereby the instructions executed on the computer or other programmable devices provide steps for implementing the functions specified in one or more processes in the flowcharts and/or one or more blocks in the block diagrams.

Apparently, those skilled in the art may make various changes and modifications to the disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A data sharing system, comprising:
a device to which a first application belongs, configured to determine a target access address corresponding to a target application identifier of a second application according to a pre-stored correspondence between application identifiers and access addresses, and send a sharing request for sharing data of the second application to the target access address, wherein the sharing request carries the target application identifier;
a device to which the target access address belongs, configured to receive the sharing request and determine a target database corresponding to the target application identifier according to a stored correspondence between application identifiers and databases, obtain data stored in the target database, determine a target encryption key corresponding to the target application identifier according to a stored correspondence between application identifiers and encryption keys, decrypt the obtained data according to the target encryption key, and send the decrypted data to the device to which the first application belongs; and
the target database, configured for data storage.

2. The system according to claim 1, further comprising a management platform and a device to which the second application belongs, wherein:
the device to which the first application belongs is further configured to send a request for sharing the data of the second application to the management platform, wherein the request carries an application identifier of the first application;
the management platform is configured to receive the request and send the request to the device to which the second application belongs;
the device to which the second application belongs is configured to receive the request and display the application identifier of the first application carried in the request, and when a confirmation note for agreeing to share data with the first application is received, send the confirmation note to the management platform;
the management platform is further configured to receive the confirmation note, and send the stored target application identifier of the second application and the target access address corresponding to the target application identifier to the device to which the first application belongs; and
the device to which the first application belongs is further configured to store a correspondence between the target application identifier and the target access address.

3. The system according to claim 1, wherein the device to which the target access address belongs is further configured to determine whether a type of the sharing request is a data read request or a data write request, and according to the type of the sharing request and a pre-stored access permission of the first application to the data of the second application, determine whether the sharing request complies with the access permission, and when the sharing request complies with the access permission, determine the target database corresponding to the target application identifier according to the stored correspondence between application identifiers and databases.

4. The system according to claim 1, wherein the device to which the target access address belongs is further configured to desensitize the decrypted data when the decrypted data contains predefined sensitive data, and send the desensitized data to the device to which the first application belongs.

5. The system according to claim 3, wherein the device to which the target access address belongs is further configured to determine whether the target application identifier carried in the sharing request is secondary identification information of the second application when the target application identifier of the second application includes primary identification information and the secondary identification information, and when the target application identifier carried in the sharing request is the secondary identification information of the second application, determine whether the type of the sharing request is a data read request or a data write request, and determine whether the sharing request complies with the access permission according to the type of the sharing request and the pre-stored access permission of the first application to the data of the second application.

6. The system according to claim 1, further comprising a management platform and a device to which the second application belongs, wherein:
the device to which the second application belongs is configured to send a data storage security protection request to the management platform, where the data storage security protection request carries a name of the second application and the target access address of the second application;
the management platform is further configured to receive the data storage security protection request, generate the target application identifier and the target encryption key corresponding to the name of the second application, and store a correspondence between the target application identifier and the target encryption key;
the device to which the target access address belongs is further configured to send a key acquisition request to the management platform to obtain the target encryption key corresponding to the second application;
the management platform is configured to receive the key acquisition request, determine the target encryption key corresponding to the target application identifier of the second application according to the stored correspondence between application identifiers and encryption keys, and send the target encryption key to the device to which the target access address belongs; and
the device to which the target access address belongs is further configured to receive the target encryption key and store the correspondence between the target application identifier and the target encryption key.

7. The system according to claim 6, wherein:
the target encryption key stored in the management platform is stored in a trusted execution environment (TEE) of the management platform; and/or
the target encryption key stored in the device to which the target access address belongs is stored in a TEE of the device to which the target access address belongs.

8. The system according to claim 6, wherein the management platform is further configured to decrypt the target encryption key according to a first TEE physical storage root key when the stored target encryption key is a key encrypted according to a configured first TEE physical storage root key, and send the decrypted target encryption key to the device to which the target access address belongs.

9. The system according to claim 6, wherein the management platform is further configured to send the target encryption key to the device to which the target access address belongs according to an established secure channel.

10. The system according to claim 9, wherein:

the management platform is further configured to encrypt the target encryption key according to a temporary secure channel key negotiated with the device to which the target access address belongs, and send the encrypted target encryption key to the device to which the target access address belongs through the secure channel; and the device to which the target access address belongs is further configured to receive the target encryption key encrypted according to the temporary secure channel key negotiated with the management platform, and decrypt the target encryption key according to the temporary secure channel key.

11. The system according to claim 6, wherein the device to which the target access address belongs is further configured to encrypt the target encryption key according to a configured second TEE physical storage root key and store the encrypted target encryption key.

12. The system according to claim 6, wherein:

the device to which the second application belongs is further configured to send a data write request to the target access address, wherein the data write request carries data to be written into database and the target application identifier of the second application; and the device to which the target access address belongs is further configured to receive the data write request, determine the target encryption key corresponding to the target application identifier according to the stored correspondence between application identifiers and encryption keys, encrypt the data to be written into database according to the target encryption key, and store the encrypted data in a corresponding target database.

13. The system according to claim 12, wherein:

the device to which the target access address belongs is further configured to send an encryption policy request for the second application to the management platform, wherein the encryption policy request carries the target application identifier corresponding to the second application;

the management platform is further configured to receive the encryption policy request, and when the data storage security protection request sent by the device, to which the second application corresponding to the target application identifier belongs, carries an encryption policy for the data, send the encryption policy to the device to which the target access address belongs; and the device to which the target access address belongs is further configured to receive the encryption policy and store a correspondence between the target application identifier and the encryption policy, when the data write request is received, determine a target encryption policy corresponding to the target application identifier according to a stored correspondence between application identifiers and encryption policies, and according to the target encryption key and the target encryption policy, encrypt the data to be written into database.

14. The system according to claim 6, wherein the device to which the second application belongs is further configured to send a data read request to the target access address, wherein the data read request carries the target application identifier of the second application; and the device to which the target access address belongs is further configured to receive the data read request, determine the target database corresponding to the target application identifier according to the stored correspondence between application identifiers and databases, obtain the data stored in the target database, determine the target encryption key corresponding to the target application identifier according to the stored correspondence between application identifiers and encryption keys, decrypt the obtained data according to the target encryption key, and send the decrypted data to the device to which the second application belongs.

15. The system according to claim 14, wherein:

the device to which the target access address belongs is further configured to send an encryption policy request for the second application to the management platform, wherein the encryption policy request carries the target application identifier corresponding to the second application;

the management platform is further configured to receive the encryption policy request, and when the data storage security protection request sent by the device, to which the second application corresponding to the target application identifier belongs, carries an encryption policy for the data, send the encryption policy to the device to which the target access address belongs; and the device to which the target access address belongs is further configured to receive the encryption policy and store a correspondence between the target application identifier and the encryption policy, when the data read request is received, determine the target encryption policy corresponding to the target application identifier according to a stored correspondence between application identifiers and encryption policies, and decrypt obtained data according to the target encryption key and the target encryption policy.

16. A data sharing method, applied to a device to which a target access address belongs, the method comprising:

receiving a sharing request sent by a device to which a first application belongs, wherein the sharing request carries a target application identifier;

determining a target database corresponding to the target application identifier according to a stored correspondence between application identifiers and databases, and obtaining data stored in the target database; and determining a target encryption key corresponding to the target application identifier according to a stored correspondence between application identifiers and encryption keys, decrypting the obtained data according to the target encryption key, and sending the decrypted data to the device to which the first application belongs.

17. The method according to claim 16, wherein, after receiving the sharing request sent by the device to which the first application belongs and before determining the target database corresponding to the target application identifier according to the stored correspondence between application identifiers and databases, the method further includes:

determining whether a type of the sharing request is a data read request or a data write request, and according to the type of the sharing request and a pre-stored access permission of the first application to the data of the second application, determining whether the sharing request complies with the access permission, and when the sharing request complies with the access permission, determining the target database corresponding to the target application identifier according to the stored correspondence between application identifiers and databases.

18. The method according to claim 17, wherein, after receiving the sharing request sent by the device to which the first application belongs and before determining whether the type of the sharing request is a data read request or a data write request, the method further includes:

when the target application identifier of the second application includes primary identification information and secondary identification information, determining whether the target application identifier carried in the sharing request is the secondary identification information of the second application, and when the target application identifier carried in the sharing request is the secondary identification information of the second application, determining whether the type of the sharing request is a data read request or a data write request.

19. The method according to claim 16, wherein:

after decrypting the obtained data according to the target encryption key and before sending the decrypted data to the device to which the first application belongs, the method further includes:

when the obtained data contains predefined sensitive data, desensitizing the decrypted data; and sending the decrypted data to the device to which the first application belongs includes:

sending the decrypted data to the device to which the first application belongs after data desensitization processing.

* * * * *